United States Patent
Yamasaki et al.

(10) Patent No.: US 11,964,507 B2
(45) Date of Patent: Apr. 23, 2024

(54) METHOD FOR PRODUCING PRINTED MATERIAL AND SYSTEM FOR PRODUCING PRINTED MATERIAL

(71) Applicant: FUJIFILM Business Innovation Corp., Tokyo (JP)

(72) Inventors: Sumiaki Yamasaki, Kanagawa (JP); Sakae Takeuchi, Kanagawa (JP); Hiroshi Saegusa, Kanagawa (JP); Yoichiro Emura, Kanagawa (JP); Yoshifumi Iida, Kanagawa (JP); Satoshi Kamiwaki, Kanagawa (JP); Susumu Yoshino, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 724 days.

(21) Appl. No.: 16/939,070

(22) Filed: Jul. 27, 2020

(65) Prior Publication Data
US 2021/0291577 A1    Sep. 23, 2021

(30) Foreign Application Priority Data
Mar. 18, 2020    (JP) .................................. 2020-047337

(51) Int. Cl.
*B42D 25/46* (2014.01)
*B32B 37/00* (2006.01)
(Continued)

(52) U.S. Cl.
CPC .......... *B42D 25/46* (2014.10); *B32B 37/0046* (2013.01); *B32B 37/12* (2013.01);
(Continued)

(58) Field of Classification Search
None
See application file for complete search history.

(56) References Cited

U.S. PATENT DOCUMENTS 5,847,738 A * 12/1998 Tutt ..................... B41M 7/0027
                                                              347/101
6,585,367 B2 * 7/2003 Gore .................... B41J 11/0015
                                                              347/102
(Continued)

FOREIGN PATENT DOCUMENTS

| JP | H02265796 | 10/1990 |
| JP | H05004477 | 1/1993 |

(Continued)

OTHER PUBLICATIONS

"Office Action of Japan Counterpart Application", issued on Nov. 21, 2023, with English translation thereof, p. 1-p. 9.

*Primary Examiner* — Michael N Orlando
*Assistant Examiner* — Abhishek A Patwardhan
(74) *Attorney, Agent, or Firm* — JCIPRNET

(57) ABSTRACT

A method for producing a printed material includes forming a color image having an image area ratio of 20% or less on a peripheral edge portion of a recording medium by using a coloring material; providing pressure-induced phase transition particles to a region of the recording medium, the region including the peripheral edge portion; bonding the color image and the pressure-induced phase transition particles onto the recording medium; and folding the recording medium having the color image and the pressure-induced phase transition particles bonded thereon and pressure-bonding the folded recording medium, or pressure-bonding the recording medium having the color image and the pressure-induced phase transition particles bonded thereon and another recording medium placed on top of each other. The pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid (Continued)

esters as polymerization components, and a mass ratio of the (meth)acrylic acid esters is 90 mass % or more of a total of all polymerization components of the (meth)acrylic acid ester resin. The pressure-induced phase transition particles have at least two glass transition temperatures, and a difference between the lowest glass transition temperature and the highest glass transition temperature among the glass transition temperatures of the pressure-induced phase transition particles is 30° C. or more.

19 Claims, 3 Drawing Sheets

(51) Int. Cl.
    *B32B 37/10*     (2006.01)
    *B32B 37/12*     (2006.01)
    *B32B 37/30*     (2006.01)
    *B32B 38/14*     (2006.01)
    *B32B 38/18*     (2006.01)
    *B42D 15/04*     (2006.01)
    *B42D 25/465*     (2014.01)
    *C08F 212/08*     (2006.01)
    *C08F 220/18*     (2006.01)
    *C08L 25/14*     (2006.01)

(52) U.S. Cl.
    CPC ......... *B42D 15/042* (2013.01); *B42D 25/465* (2014.10); *C08F 212/08* (2013.01); *C08F 220/1804* (2020.02); *C08F 220/1808* (2020.02); *C08L 25/14* (2013.01); *B32B 2037/0069* (2013.01); *B32B 37/10* (2013.01); *B32B 2037/1269* (2013.01); *B32B 37/30* (2013.01); *B32B 38/14* (2013.01); *B32B 38/1808* (2013.01); *B32B 2305/54* (2013.01); *B32B 2309/02* (2013.01); *B32B 2325/00* (2013.01); *B32B 2333/04* (2013.01); *C08L 2207/02* (2013.01); *C08L 2207/53* (2013.01)

(56) References Cited

U.S. PATENT DOCUMENTS

| | | | | |
|---|---|---|---|---|
| 9,283,803 B2* | 3/2016 | Nozawa | ................. | B43M 5/04 |
| 10,982,117 B2 | 4/2021 | Yamasaki et al. | | |
| 11,104,538 B1* | 8/2021 | Yoshino | ............. | G03G 15/2064 |
| 11,235,593 B2* | 2/2022 | Iida | ........................ | C08F 212/08 |
| 2003/0013033 A1* | 1/2003 | Kwasny | ................. | G03C 3/003 |
| | | | | 427/466 |
| 2003/0068571 A1* | 4/2003 | Uehara | ................ | B41M 5/0256 |
| | | | | 347/101 |
| 2005/0212882 A1* | 9/2005 | Naniwa | ................ | B41J 11/0022 |
| | | | | 347/101 |
| 2007/0195145 A1* | 8/2007 | Yamashita | ............. | B41J 11/007 |
| | | | | 347/101 |
| 2009/0227728 A1* | 9/2009 | Doi | ....................... | B41J 11/0024 |
| | | | | 347/100 |
| 2010/0073448 A1* | 3/2010 | Ikuno | ................... | B41M 5/5218 |
| | | | | 347/102 |
| 2010/0265292 A1* | 10/2010 | Ohshima | ............ | B41J 11/00242 |
| | | | | 347/100 |
| 2011/0242200 A1* | 10/2011 | Tojo | ........................ | B41M 7/009 |
| | | | | 347/21 |
| 2012/0082488 A1* | 4/2012 | Kubo | ................... | G03G 15/162 |
| | | | | 399/302 |
| 2013/0100222 A1* | 4/2013 | Nieda | ................... | B41J 11/0075 |
| | | | | 347/104 |
| 2013/0250021 A1* | 9/2013 | Shimomura | ........... | B41J 2/0057 |
| | | | | 347/103 |
| 2018/0275544 A1* | 9/2018 | Chonan | .............. | G03G 9/09364 |
| 2019/0292412 A1* | 9/2019 | Yamasaki | .................... | C09J 4/06 |
| 2021/0016587 A1* | 1/2021 | Iida | ........................ | C08F 212/08 |
| 2021/0017424 A1* | 1/2021 | Ishizuka | .................... | C09J 9/00 |
| 2021/0017429 A1* | 1/2021 | Ishizuka | ................ | B41M 5/504 |
| 2021/0277291 A1* | 9/2021 | Iida | ........................ | B32B 5/022 |
| 2021/0291577 A1* | 9/2021 | Yamasaki | ............. | C08F 212/08 |
| 2022/0064346 A1* | 3/2022 | Iida | ........................ | B41L 43/02 |
| 2022/0064424 A1* | 3/2022 | Iida | ........................ | C08K 9/02 |
| 2022/0064425 A1* | 3/2022 | Kashiwagi | ........... | B41M 5/5218 |
| 2022/0100125 A1* | 3/2022 | Morooka | ........... | G03G 9/08711 |

FOREIGN PATENT DOCUMENTS

| | | |
|---|---|---|
| JP | H0569687 | 3/1993 |
| JP | 2004181910 | 7/2004 |
| JP | 2008173831 | 7/2008 |
| JP | 2010-143083 | 7/2010 |
| JP | 2014-156068 | 8/2014 |
| JP | 2016-190446 | 11/2016 |
| JP | 2018-052046 | 4/2018 |
| JP | 2019167471 | 10/2019 |

\* cited by examiner

METHOD FOR PRODUCING PRINTED MATERIAL AND SYSTEM FOR PRODUCING PRINTED MATERIAL

CROSS-REFERENCE TO RELATED APPLICATIONS

This application is based on and claims priority under 35 USC 119 from Japanese Patent Application No. 2020-047337 filed Mar. 18, 2020.

BACKGROUND

(i) Technical Field

The present disclosure relates to a method for producing a printed material and a system for producing a printed material.

(ii) Related Art

Japanese Unexamined Patent Application Publication No. 2004-181910 describes a pressure-bonded concealing printed material prepared by using a postcard paper sheet having first to fourth panels connected to one another at folding lines, in which information to be disclosed is printed on front surfaces of the first panel and the fourth panel, information to be concealed is printed on front surfaces of the second panel and the third panel, and the postcard paper sheet is accordion-folded into a pressure-bonded concealing postcard. Here, the front surfaces of the second panel and the third panel are detachably bonded via a weak bonding layer, the back surfaces of the first panel and the second panel are undetachably bonded via a strong bonding layer, and the back surfaces of the third panel and the fourth panel are undetachably bonded via a strong bonding layer.

Japanese Unexamined Patent Application Publication No. 02-265796 describes a package for mailing a thin magnetic card, the package including a postcard-size rectangular sheet having a postage stamp column, a zip code column, an address column, and a thin magnetic card-receiving space outside the postage stamp column, the zip code column, and the address column, and a cover sheet formed of an opaque sheet large enough to cover a front surface of the thin magnetic card and having a perforated cut line for taking the thin magnetic card out, the cover sheet sealing and packaging the thin magnetic card.

Japanese Unexamined Patent Application Publication No. 05-004477 describes a folding-type postcard that has sealed inside and periphery and that can be opened easily, the postcard being prepared by applying, before or after printing out, formulated pressure-sensitive adhesives to particular portions of the periphery and the inside of a fanfold- or sheet-shaped computer-interfaced printout form output from an impact printer or a laser beam printer, then folding the printout form in two, and pressure-bonding the folded form.

SUMMARY

One example of a method for producing a printed material includes a method (hereinafter this method may also be referred to as a "particular method") that involves a step of forming a color image on a peripheral edge portion of a recording medium by using a coloring material; a step of providing pressure-induced phase transition particles to a recording medium, a step of bonding the color image and the pressure-induced phase transition particles onto the recording medium, and a step of folding the recording medium having the color image and the pressure-induced phase transition particles bonded thereon and pressure-bonding the folded recording medium, or pressure-bonding the recording medium having the color image and the pressure-induced phase transition particles bonded thereon and another recording medium placed on top of each other.

The pressure-bonded printed material obtained by the aforementioned particular method desirably undergoes less peeling in a peripheral edge portion of the printed material even when impact is applied to the periphery, for example.

Aspects of non-limiting embodiments of the present disclosure relate to a method for producing a printed material that can produce a pressure-bonded printed material with which peeling of a peripheral edge portion is suppressed compared to the aforementioned particular method in which the image area ratio of the color image in the peripheral edge portion of the recording medium exceeds 20%.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a method for producing a printed material that includes forming a color image having an image area ratio of 20% or less on a peripheral edge portion of a recording medium by using a coloring material; providing pressure-induced phase transition particles to a region of the recording medium, the region including the peripheral edge portion; bonding the color image and the pressure-induced phase transition particles onto the recording medium; and folding the recording medium having the color image and the pressure-induced phase transition particles bonded thereon and pressure-bonding the folded recording medium, or pressure-bonding the recording medium having the color image and the pressure-induced phase transition particles bonded thereon and another recording medium placed on top of each other. The pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid esters as polymerization components, and a mass ratio of the (meth)acrylic acid esters is 90 mass % or more of a total of all polymerization components of the (meth)acrylic acid ester resin. The pressure-induced phase transition particles have at least two glass transition temperatures, and a difference between the lowest glass transition temperature and the highest glass transition temperature among the glass transition temperatures of the pressure-induced phase transition particles is 30° C. or more.

BRIEF DESCRIPTION OF THE DRAWINGS

Exemplary embodiments of the present disclosure will be described in detail based on the following figures, wherein.

DETAILED DESCRIPTION

Figure 1:
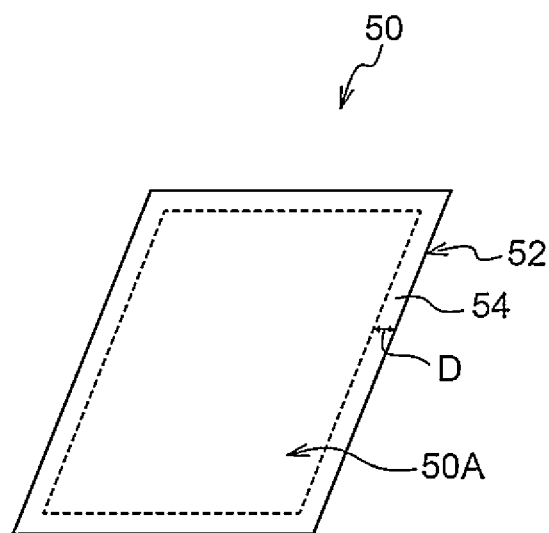
FIG. 1 is a schematic diagram illustrating one example of a recording medium according to an exemplary embodiment.

Exemplary embodiments of the present disclosure will now be described. The following descriptions and examples are merely exemplary embodiments and do not limit the scopes of the exemplary embodiments.

When numerical ranges are described stepwise in the present description, the upper limit or the lower limit of one numerical range may be substituted with an upper limit or a lower limit of a different numerical range also described stepwise. In the numerical ranges described in the present description, the upper limit or the lower limit of one numerical range may be substituted with a value indicated in Examples.

In the present description, the term "step" not only refers to an independent step but also refers to any instance that achieves the desired purpose of that step although such a step is not clearly distinguishable from other steps.

In the present description, when a drawing is referred to describe an exemplary embodiment, the structure of that exemplary embodiment is not limited to the structure illustrated in the drawing. Moreover, the size of a member in each drawing is schematic, and the relative size relationship between the members is not limited to what is illustrated.

In the present description, each component may contain more than one corresponding substances. In the present description, when the amount of a component in a composition is referred and when there are two or more substances that correspond to that component in the composition, the amount is the total amount of the two or more substances in the composition unless otherwise noted.

In the present description, particles corresponding to each component may contain more than one types of particles. When there are more than one types of particles corresponding to one component in the composition, the particle diameter of each component is a particle diameter of a mixture of the more than one types of particles present in the composition unless otherwise noted.

In the present description, the notation "(meth)acryl" means "acryl" or "methacryl".

In the present description, the "peel strength" is an indicator of the degree of peeling between opposing surfaces of the recording medium, and is substantially equivalent to the "adhesiveness" that indicates the degree of bonding. In the description below, the term "peel strength" indicates the peel strength between the opposing surfaces of the recording medium, and the term "adhesiveness" indicates the adhesiveness between the opposing surfaces of the recording medium.

Method for Producing Printed Material and System for Producing Printed Material

A method for producing a printed material according to the present exemplary embodiment includes a step of forming a color image having an image area ratio of 20% or less on a peripheral edge portion of a recording medium by using a coloring material; a step of providing pressure-induced phase transition particles to a region of the recording medium, the region including the peripheral edge portion; a step of bonding the color image and the pressure-induced phase transition particles onto the recording medium; and a step of folding the recording medium having the color image and the pressure-induced phase transition particles bonded thereon and pressure-bonding the folded recording medium, or pressure-bonding the recording medium having the color image and the pressure-induced phase transition particles bonded thereon and another recording medium placed on top of each other.

The pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid esters as polymerization components, and a mass ratio of the (meth)acrylic acid esters is 90 mass % or more of a total of all polymerization components of the (meth)acrylic acid ester resin.

The pressure-induced phase transition particles have at least two glass transition temperatures, and a difference between the lowest glass transition temperature and the highest glass transition temperature among the glass transition temperatures of the pressure-induced phase transition particles is 30° C. or more.

Here, the "peripheral edge portion of the recording medium" refers to an edge portion that extends along the periphery of the recording medium and that lies in a recording surface of the recording medium, and is specifically a region 0 mm or more and 5 mm or less distant from the periphery.

The "image area ratio" refers to the ratio of the area in which the color image is formed in the peripheral edge portion of the recording medium, and is a value determined as follows. Specifically, at arbitrarily selected 8 positions in the peripheral edge portion of the recording medium, the area of the color image formed in a 5 mm×5 mm region (hereinafter this region may be referred to as the "measurement region") is determined, the ratio of the area of the color image relative to the entire measurement region is determined, and the results are averaged to obtain this value. The area of the color image is measured by using, for example, an image density meter (model X-rite 938 produced by X-Rite Inc.).

The "color image" may be any image that contains a coloring material, and an example thereof is an image having an average light transmittance of less than 90% in a visible region (400 nm to 700 nm). The average light transmittance of the color image is preferably less than 50% and more preferably less than 10%. The average transmittance is measured with a spectrophotometer V700 (produced by JASCO Corporation).

The "pressure-induced phase transition particles" refer to particles that undergo pressure-induced phase transition and specifically refer to particles that satisfy formula 1 below:

$$10° C. \le T1-T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining the temperature T1 and the temperature T2 is described below.

Hereinafter, among pressure-induced phase transition particles, those pressure-induced phase transition particles which have following properties are also referred to as "particular particles": the pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid esters as polymerization components, and a mass ratio of the (meth)acrylic acid esters is 90 mass % or more of a total of all polymerization components of the (meth)acrylic acid ester resin; and the pressure-induced phase transition particles have at least two glass transition temperatures, and a difference between the lowest glass transition temperature and the highest glass transition temperature among the glass transition temperatures of the pressure-induced phase transition particles is 30° C. or more.

A printed material formed by folding a recording medium and pressure-bonding the opposing surfaces or a printed material formed by placing two or more recording media on top of each other and pressure-bonding the opposing surfaces is also referred to as a "pressure-bonded printed material".

In addition, a recording medium after the particular particles are provided to a region that contains at least a peripheral edge portion may also be referred to as a "particle-provided recording medium".

In the method for producing a printed material according to this exemplary embodiment, a pressure-bonded printed material with less peeling in the peripheral edge portion is obtained compared to when the image area ratio of the color image in the peripheral edge portion of the recording medium exceeds 20% in the particular method. This is because the image area ratio of the color image in the peripheral edge portion of the recording medium is set to 20% or less and the particular particles are used as the pressure-induced phase transition particles. The reason behind this is not exactly clear, but is presumably as follows.

When the image area ratio of the color image in the peripheral edge portion of the recording medium exceeds 20%, unintended peeling may occur from the ends of the pressure-bonded surface in the event of impact on the periphery of the obtained pressure-bonded printed material, for example. This peeling is considered to start often from the portion in the peripheral edge portion of the recording medium where the color image has been formed. Although the reason behind this is not exactly clear, it is presumably due to degradation in adhesiveness, which has been achieved by pressure-bonding the recording medium by using the pressure-induced phase transition particles, in the region where the color image has been formed compared to the region where no color image is formed. This degradation of adhesiveness is considered to be particularly prominent when the color image contains a resin (in other words, when the color image is formed by using a resin-containing coloring material). Moreover, it is considered that peeling at the peripheral edge portion of the pressure-bonded printed material readily occurs due to degradation of adhesiveness as the image area ratio of the color image exceeds 20% in the peripheral edge portion.

However, in this exemplary embodiment in which the image area ratio of the color image in the peripheral edge portion of the recording medium is 20% or less, the region with degraded adhesiveness is small, and presumably thus peeling of the peripheral edge portion in the pressure-bonded printed material is suppressed.

Moreover, according to the method for producing a printed material according to this exemplary embodiment, a pressure-bonded printed material with less peeling in the peripheral edge portion is obtained compared to when particles containing a styrene resin and a (meth)acrylic acid ester resin which is a homopolymer of a (meth)acrylic acid ester are used instead of the particular particles. This is because, in the aforementioned particular method, the image area ratio of the color image in the peripheral edge portion of the recording medium is set to 20% or less and the particular particles are used as the pressure-induced phase transition particles. The reason behind this is not exactly clear, but is presumably as follows.

In general, a styrene resin and a (meth)acrylic acid ester resin have low compatibility to each other, and thus it is considered that these resins in the particles are in a phase separated state. Moreover, when the particles are pressured, the (meth)acrylic acid ester resin having a relatively low glass transition temperature is fluidized first, and this fluidization affects the styrene resin, resulting in fluidization of both resins. It is also considered that when the two resins in the particles solidify and form a resin layer as the pressure is decreased after the two resins have fluidized under pressure, a phase separated state is again formed due to their low compatibility.

It is assumed that a (meth)acrylic acid ester resin that contains at least two (meth)acrylic acid esters as polymerization components is easily fluidizable under pressure because there are at least two types of ester groups bonded to the main chain and thus the degree of molecular alignment in a solid state is low compared to a homopolymer of a (meth)acrylic acid ester. Moreover, it is assumed that when the mass ratio of the (meth)acrylic acid esters relative to the total of the polymerization components is 90 mass % or more, at least two types of ester groups are present at a high density; thus, the degree of molecular alignment in a solid state becomes lower, and thus the resin becomes easily fluidizable under pressure. Thus, it is assumed that the above-described particular particles are easily fluidizable under pressure, in other words, easily undergo pressure-induced phase transition, compared to particles in which the (meth)acrylic acid ester resin is a homopolymer of a (meth)acrylic acid ester.

In addition, it is assumed that a (meth)acrylic acid ester resin containing at least two (meth)acrylic acid esters as polymerization components, in which the mass ratio of the (meth)acrylic acid esters relative to the total of polymerization components is 90 mass % or more, has a low degree of molecular alignment during re-solidification, and, thus, a microphase separation occurs with a styrene resin. The finer the state of phase separation between the styrene resin and the (meth)acrylic acid ester resin, the higher the uniformity of the state of the bonding surface to an adherend, and the more excellent the adhesiveness achieved by pressure bonding. Thus, it is assumed that the aforementioned particular particles have excellent adhesiveness achieved by pressure bonding compared to particles in which the (meth)acrylic acid ester resin is a homopolymer of a (meth)acrylic acid ester.

Presumably thus, according to the method for producing a printed material according to this exemplary embodiment in which particular particles that exhibit excellent adhesiveness when pressure-bonded, a pressure-bonded printed material with less peeling in the peripheral edge portion is obtained compared to when particles containing a styrene resin and a (meth)acrylic acid ester resin which is a homopolymer of a (meth)acrylic acid ester are used instead of the particular particles.

The method for producing a printed material of this exemplary embodiment is performed in a system for producing a printed material according to an exemplary embodiment described below.

A system for producing a printed material according to an exemplary embodiment includes a color image forming unit that forms a color image having an image area ratio of 20% or less on a peripheral edge portion of a recording medium by using a coloring material; a pressure-induced phase transition particles-providing unit that stores particular particles and provides the particular particles to a region of the recording medium, the region including the peripheral edge portion; a bonding unit that bonds the color image and the particular particles onto the recording medium; and a pressure-bonding unit that folds the recording medium (in other words, the particle-provided recording medium) having the color image and the particular particles bonded thereon and pressure-bonds the folded recording medium, or that pressure-bonds the recording medium (in other words, the particle-provided recording medium) having the color image and the particular particles bonded thereon and another recording medium (in other words, a recording medium other than the particle-provided recording medium) placed on top of each other.

Hereinafter, the steps of the method for producing a printed material according to an exemplary embodiment are described together with the sections of the system for producing a printed material according to an exemplary embodiment.

Color Image Forming Step and Color Image Forming Unit

In the color image forming step, a color image is formed on the recording medium by using a coloring material so that the image area ratio of the color image in the peripheral edge portion of the recording medium is 20% or less.

FIG. 1 illustrates one example of a recording medium used in producing a pressure-bonded printed material. A recording surface 50A of a recording medium 50 illustrated in FIG. 1 has a peripheral edge portion 54 that extends along a periphery 52. The peripheral edge portion 54 is a region up to a distance D of 5 mm from the periphery 52. In the color image forming step, a color image is formed on the recording surface 50A of the recording medium 50 so that the image area ratio of the color image at least in the peripheral edge portion 54 is 20% or less.

The image area ratio of the color image in the peripheral edge portion of the recording medium is 20% or less, and from the viewpoint of suppressing peeling in the peripheral edge portion of the pressure-bonded printed material, the image area ratio is preferably 10% or less and more preferably 7% or less.

Meanwhile, from the viewpoint of suppressing breaking when the pressure-bonded printed material is peeled after being stored at a high temperature and a high humidity, the image area ratio of the color image in the peripheral edge portion of the recording medium is preferably 2% or more, more preferably 3% or more and yet more preferably 4% or more.

In other words, from the viewpoint of simultaneously achieving suppression of peeling in the peripheral edge portion of the pressure-bonded printed material and suppression of breaking when the pressure-bonded printed material is peeled after being stored at a high temperature and a high humidity, the image area ratio of the color image in the peripheral edge portion of the recording medium is preferably 2% or more and 20% or less, more preferably 3% or more and 10% or less, and yet more preferably 4% or more and 7% or less.

A pressure-bonded printed material in which breaking is suppressed after peeling after being stored at a high temperature and high humidity is obtained by setting the image area ratio of the color image in the peripheral edge portion of the recording medium to 2% or more. The reasons for this is not clear but is presumed to be as follows.

End portions of the pressure-bonded surface of the pressure-bonded printed material are likely to locally receive pressure in the pressure-bonding step; thus, bonding force locally increases over time under storage at a high temperature and a high humidity, thereby making the pressure-bonded printed material more prone to breaking when a user tries to peel the pressure-bonded portion. In contrast, it is presumed that by setting the image area ratio of the color image in the peripheral edge portion of the recording medium to 2% or more, the increase in bonding force over time in the region of the peripheral edge portion where the color image is suppressed, and thus breaking is suppressed when peeled.

The method for setting the image area ratio of the color image in the peripheral edge portion of the recording medium to 2%, or more is not particularly limited, and an example is a method involving forming a color pattern image in the peripheral edge portion of the recording medium. A pattern image is an image in which a particular image is periodically repeated.

Specific examples of the pattern image include a line pattern image, a dotted pattern image, and a combination thereof. Examples of the line pattern image include a grid-shaped pattern image and a perforated pattern image. The shape of the dots constituting the dotted pattern image may be any, and may be any geometrical shape such as circular, elliptic, polygonal, and star shapes, or may be non-geometrical shape.

When the pattern image is a dotted pattern image, the number of dot images in a 5 mm×5 mm range is not particularly limited, and may be 10 or more and 200 or less, for example.

The color of the pattern image is not particularly limited, and may be yellow from the viewpoint of making the pattern image inconspicuous.

Figure 2:
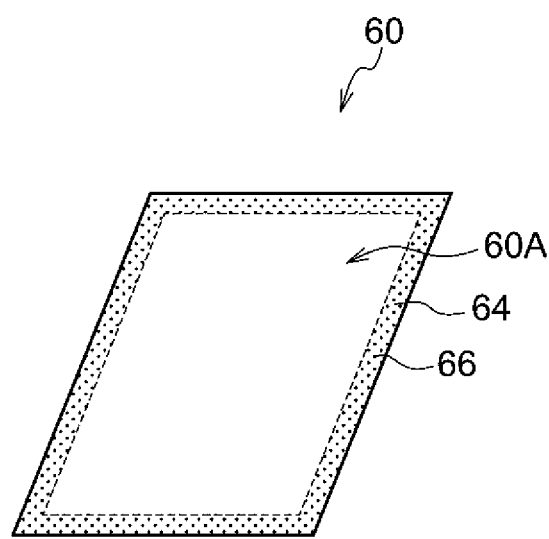
FIG. 2 is a schematic diagram illustrating another example of the recording medium according to an exemplary embodiment.

FIG. 2 illustrate one example of a recording medium on which a dotted pattern image is formed as a color image in the peripheral edge portion. A recording medium 60 illustrated in FIG. 2 has a pattern image 66, which is a color image, formed in a peripheral edge portion 64 of a recording surface 60A. The pattern image 66 is a dotted pattern image, and each of the dots has a circular shape. In the color image forming step, a pressure-bonded printed material in which breaking that may occur when the pressure-bonded printed material is peeled after being stored at a high temperature and a high humidity is suppressed is obtained by forming the pattern image 66 in the peripheral edge portion 64 and by setting the image area ratio of the color image in the peripheral edge portion 64 to 2% or more.

Although the recording medium 60 illustrated in FIG. 2 has the pattern image 66 formed only on the peripheral edge portion 64, this is not limiting; alternatively, the pattern image 66 may be formed in a region other than the peripheral edge portion 64 or on the entire recording surface 60A.

In the color image forming step, the properties (image area ratio, shape, color, etc.) of the color image formed in a region of the recording surface of the recording medium other than the peripheral edge portion are not particularly limited.

In a region having a distance of greater than 5 mm but not greater than 10 mm from the periphery (hereinafter this region may be referred to as a "quasi peripheral edge portion") among the region in the recording surface of the recording medium other than the peripheral edge portion, the image area ratio of the color image is preferably 20% or less, more preferably 10% or less, and yet more preferably 7% or less from the viewpoint of suppressing peeling in the peripheral edge portion of the pressure-bonded printed material.

The color image forming unit that forms a color image on a recording medium is not particularly limited, and examples thereof include a section that forms a color ink image as the color image on a recording medium by an ink jet method using a color ink as a coloring material, and a section that electrophotographically forms a color toner image as the color image on a recording medium by using an electrostatic charge image developer containing a color toner as a coloring material.

The color image forming unit that uses an ink jet method is equipped with, for example, a liquid ejection head that ejects a liquid that serves as an ink.

The color image forming unit that uses an ink jet method may be of a direct ejection type in which a liquid is directly ejected from a liquid ejection head onto a recording medium, or of an intermediate transfer type in which a liquid ejection head ejects a liquid onto an intermediate transfer body and then the liquid ejected onto the intermediate transfer body is transferred onto a recording medium.

The color image forming unit that uses an electrophotographic system is equipped with, for example, a photoreceptor, a charging section that charges a surface of the photoreceptor, an electrostatic charge image forming section that forms an electrostatic charge image on the charged surface of the photoreceptor, a developing section that stores an electrostatic charge image developer containing a color toner and develops the electrostatic charge image on the surface of the photoreceptor into a color toner image by using the electrostatic charge image developer, and a transfer section that transfers the color toner image on the surface of the photoreceptor onto a surface of a recording medium.

The toner image forming unit that uses an electrophotographic system may be of a direct type in which a color image is directly formed on a recording medium, or of an intermediate transfer type in which a color image is formed on a surface of an intermediate transfer body and then the color age on the surface of the intermediate transfer body is transferred onto a surface of a recording medium. Moreover, the color image forming unit may be further equipped with a cleaning section that cleans the surface of the photoreceptor before charging and after the transfer of the color image, and a charge erasing section that erases charges on the surface of the photoreceptor by applying charge erasing light after the transfer of the color image and before charging.

When the electrophotographic color image forming unit is of an intermediate transfer type, the transfer section includes, for example, an intermediate transfer body having a surface onto which a color toner image is transferred, a first transfer section that transfers the color toner image on the surface of the photoreceptor onto a surface of the intermediate transfer body, and a second transfer section that transfers the color toner image on the surface of the intermediate transfer body onto a surface of a recording medium.

Examples of the color image forming step of forming a color image on a recording medium specifically include a step of forming a color ink image on a recording medium by an ink jet method using a color ink as a coloring material, and a step of forming a color toner image on a recording medium by an electrophotographic method by using an electrostatic charge image developer containing a color toner as a coloring material.

The color image forming step that uses an ink jet method includes, for example, a liquid ejecting step of ejecting a liquid that serves as an ink.

The color image forming step that uses an ink jet method may be of a direct ejection type in which a liquid is directly ejected onto a recording medium, or of an intermediate transfer type in which a liquid is ejected onto an intermediate transfer body and then the liquid ejected onto the intermediate transfer body is transferred onto a recording medium.

The color image forming unit that uses an electrophotographic system includes, for example, a charging step of charging a surface of a photoreceptor, an electrostatic charge image forming step of forming an electrostatic charge image on the charged surface of the photoreceptor, a developing step of developing the electrostatic charge image on the surface of the photoreceptor into a color toner image by using an electrostatic charge image developer containing a color toner, and a transfer step of transferring the color toner image on the surface of the photoreceptor onto a surface of a recording medium.

Examples of the recording medium used in the color image forming step include paper, coated paper obtained by coating the surface of paper with a resin or the like, cloths, nonwoven cloths, resin films, and resin sheets.

In the color image forming step, an image is formed on one or both surfaces of the recording medium.

Pressure-Induced Phase Transition Particle-Providing Step and Pressure-Induced Phase Transition Particle-Providing Unit In the providing step, the pressure-induced phase transition particle-providing unit (hereinafter may also be referred to as a "providing unit") provides particular particles to a region in the recording medium that includes at least the peripheral edge portion. The particular particles are described in detail below.

A particular particle-providing section in the providing unit is not particularly limited, and may be any section capable of providing a desired amount of particular particles at a desired position in the surface of the recording medium.

Specific examples of the particular particle-providing section include a section that sprays particular particles, a section that applies particular particles, and an electrophotographic section that uses particular particles as a toner.

Position where Particular Particles are Provided

Particular particles are provided on at least one of the surfaces of a recording medium and in a region of a recording surface of the recording medium that includes at least the peripheral edge portion.

The position where the particular particles are provided may be the entire surface or a part of the surface of the recording medium.

The position where the particular particles are provided relative to the recording medium may be only a region in the recording surface of the recording medium where no image is formed (in other words, a non-image region) or both a region where an image is formed (in other words, an image region) and a non-image region.

As described below, the particular particles may be transparent.

When the particular particles are provided to an image region of the recording medium and when the particular particles are transparent, the visibility of the image region is improved.

In this exemplary embodiment, "transparent" means that the average transmittance of the region in which the particular particles are provided is 10% or more for light in the visible range (400 nm or more and 700 nm or less). The average transmittance is preferably 50% or more, more preferably 80% or more, and yet more preferably 90% or more.

The average transmittance is measured with a spectrophotometer V700 (produced by JASCO Corporation).

Provided State of Particular Particles

The provided state of the particular particles may be a state in which the particle shape remains or a state in which the particular particles are gathered to form a layer. From the viewpoint of obtaining sufficient peel strength (or adhesiveness achieved by pressure bonding), the particular particles may form a layer.

The layer formed of the particular particles may be a continuous layer or a discontinuous layer.

From the viewpoint of obtaining sufficient adhesiveness by sufficient pressure bonding, the amount of the provided particular particles is preferably 0.5 $g/m^2$ or more and 50.0 $g/m^2$ or less, more preferably 1.0 $g/m^2$ or more and 40.0 $g/m^2$ or less, and yet more preferably 1.5 $g/m^2$ or more and 30.0 $g/m^2$ or less. The thickness of the layer of the pressure-responsive particles (preferably transparent pressure-responsive particles) on the recording medium is, for example, 0.2 μm or more and 25 μm or less, 0.4 μm or more and 20 μm or less, or 0.6 μm or more and 15 μm or less.

Providing Particular Particles

As described above, the particular particles may be provided in any manner as long as particular particles are provided at an intended position, and specific examples thereof include a method that sprays particular particles, a method that applies particular particles, and an electrophotographic method that uses particular particles as a toner. The particular particles may be provided directly onto the recording medium by dropping or roll coating. The method for providing the particular particles is not particularly limited as long as the particular particles are provided to a recording medium.

Examples of the unit that provides particular particles onto a recording medium include a unit that sprays particular particles, a unit that applies particular particles, and an electrophotographic unit that uses particular particles as a toner.

The providing step that involves spraying includes, for example, a step of preparing a dispersion containing dispersed particular particles, a step of spraying the dispersion onto a recording medium, and a step of drying the dispersion sprayed onto the recording medium.

In addition, the providing unit that performs spraying is equipped with, for example, a spraying section that sprays a dispersion containing dispersed particular particles onto a recording medium and a drying section that dries the dispersion sprayed onto the recording medium.

One example of the spraying section include a sprayer. Examples of the drying section include a hot air blower, an infrared heater, and a laser radiator.

The providing step that involves an application method includes, for example, a step of applying particular particles to a recording medium. In the application method, a coating solution containing dispersed particular particles may be used. The providing step that involves an application method using a coating solution may include a step of preparing a coating solution containing dispersed particular particles, a step of applying the coating solution to a recording medium, and a step of drying the coating solution applied to the recording medium.

The providing unit that involves an application method is, for example, equipped with an applying section that applies particular particles to a recording medium. The providing unit that involves an application method using a coating solution may be equipped with, for example, an application section that applies the coating solution to a recording medium, and a drying section that dries the applied coating solution on the recording medium.

One example of the application section is a roll.

The electrophotographic providing step includes, for example, a charging step of charging a surface of an image carrier; an electrostatic charge image forming step of forming an electrostatic charge image on the charged surface of the image carrier; a developing step of developing the electrostatic charge image on the surface of the image carrier into a particular particle region by using an electrostatic charge image developer containing the particular particles; and a transfer step of transferring the particular particle region on the surface of the image carrier onto a recording medium.

An electrophotographic providing unit includes, for example, an image carrier, a charging section that charges a surface of the image carrier, an electrostatic charge image forming section that forms an electrostatic charge image on the charged surface of the image carrier, a developing section that stores an electrostatic charge image developer containing the particular particles and develops the electrostatic charge image on the surface of the image carrier into a particular particle region by using the electrostatic charge image developer, and a transfer section that transfers the particular particle region on the surface of the image carrier onto a surface of a recording medium.

In the electrophotographic providing unit, a part that includes the developing section may be configured as a cartridge structure (in other words, a process cartridge) that is detachably attachable to the particle providing device. For example, a process cartridge detachably attachable to the particle providing device and equipped with a developing section storing an electrostatic charge image developer that contains the particular particles may be used as this process cartridge.

The electrophotographic providing method and unit may respectively use an image forming method and an image forming apparatus, and known steps and sections employed in an electrophotographic image forming method and an electrophotographic image forming apparatus.

In addition, the electrophotographic providing method and unit may employ an intermediate transfer system. In the intermediate transfer system, for example, a particular particle region formed on the surface of the image carrier is temporarily transferred to the surface of the intermediate transfer body and then ultimately transferred onto a surface of a recording medium from the surface of the intermediate transfer body.

Furthermore, the electrophotographic providing method and unit may, for example, respectively include the sections and steps other than those described above, such as a step and section of cleaning the surface of the image carrier and a device equipped with a charge erasing section that erases charges by irradiating the surface of the image carrier with charge erasing light.

When a recording medium with an image thereon is used, particular particles may be provided to a recording medium already having an image thereon or an image forming step of forming an image on a recording medium and a step of providing particular particles may be continuously performed.

Examples of the method for continuously performing the image forming step and the providing step include a method that involves performing a providing step after an image forming step that uses an ink jet recording method, and a method that involves performing both an image forming step and a providing step by an electrophotographic system. A specific example is a method that involves forming a composite image on a surface of a recording medium by using both an image-forming coloring material (preferably a color ink) in the image forming step and particular particles in the providing step.

Bonding Step and Bonding Unit

In the bonding step, for example, the color image formed on the recording medium and the particular particles provided to the recording medium are heated in the bonding unit.

The section that heats the color image and the particular particles (hereinafter this section may also be referred to as a "particle heating section") is not particularly limited, and may be any section that can heat the color image formed on the recording medium and the particular particles provided onto the recording medium.

The section that heats the color image and the particular particles (particle heating section) may be of a contact type or a non-contact type.

The contact-type particle heating section may involve heating a member, such as a roll, a belt, or a pad, and causing the heated member to contact the color image and the particular particles, for example.

The non-contact-type particle heating section may involve passing a recording medium with a color image and particular particles thereon through a zone heated with a heater, an oven, or the like, or may involve heating a color image and particular particles with illuminating light from a halogen lamp, xenon lamp, or the like.

In particular, from the viewpoint of heating the particular particles and suppressing movement, detachment, etc., of the particular particles, a contact-type particle heating section may be used in the bonding step.

In other words, the particle heating section may be a contact-type particle heating section.

Heating Particular Particles by Contact-Type Method

When heating a color image and particular particles by a contact-type method, the set temperature of the member (also referred to as a contact member) contacting the color image and the particular particles may be any temperature at which the particular particles can be plasticized. However, from the viewpoint of efficiency of heating the particular particles, etc., the set temperature is, for example, preferably 120° C. or more and 250° C. or less, more preferably 130° C. or more and 200° C. or less, and yet more preferably 150° C. or more and 180° C. or less.

Here, the set temperature of the contact member refers to the target value of the surface temperature of the contact member contacting the color image and the particular particles.

The contact member may be any member that has a surface heated to the aforementioned set temperature, and examples thereof include a roll, a belt, and a pad.

The bonding step may be a step of heating and pressurizing the color image and the particular particles.

When the color image and the particular particles are heated and pressurized simultaneously, the particular particle-provided surface (for example, the surface of a layer formed of the particular particles) can be made flat and smooth.

The pressure applied to the color image and the particular particles in the bonding step is, for example, a pressure applied by an electrophotographic fixing section.

Examples of the section that heats and pressurizes the color image and the particular particles (this section is also referred to as a heating and pressurizing member) are as follows:

A heating and pressurizing roll pair constituted by two contacting rolls at least one of which applies heat and between which a recording medium with the color image and the particular particles thereon is passed to be heated and pressurized; a heating and pressurizing member constituted by a roll and a belt in contact with each other, in which at least one of the roll and the belt applies heat, and a recording medium with the color image and the particular particles thereon is passed between the roll and the belt to be heated and pressurized; and a heating and pressurizing belt pair constituted by two contacting belts at least one of which applies heat and between which a recording medium with the color image and the particular particles thereon is passed to be heated and pressurized.

Pressure-Bonding Step and Pressure-Bonding Unit

In the pressure-bonding step, a multilayer body obtained by folding a recording medium (in other words, a particle-provided recording medium) having a color image and particular particles bonded thereon in such a manner that the particular particles are sandwiched between flaps or a multilayer body obtained by placing another recording medium on top of a recording medium having a color image and particular particles bonded thereon with the particular particles sandwiched between the recording media is pressurized in the thickness direction.

The way in which the particle-provided recording medium is folded may be in two, in three, or in four, and only one part of the recording medium may be folded. At this stage, the particular particles heated in the bonding step are disposed on at least part of at least one surface of the two opposing surfaces of the flaps of the particle-provided recording medium.

The way in which a particle-provided recording medium and another recording medium are placed on top of each other may be, for example, that one recording medium is placed on top of the particle-provided recording medium or one recording medium is placed on top of each of multiple positions on a particle-provided recording medium. This other recording medium may have an image formed on one or both surfaces in advance, may be free of any image, or may be a pressure-bonded printed material prepared in advance. At this stage, the particular particles heated in the bonding step are disposed on at least part of at least one surface of the two opposing surfaces of the particle-provided recording medium and another recording medium.

The section that pressurizes the multilayer body (multilayer body pressurizing section) may be any section that can pressurize the multilayer body in the thickness direction, and may be, for example, a section that allows the multilayer body to pass between a pair of rolls or a section that pressurizes the multilayer body by using a pressing machine or the like.

In particular, the pressure-bonding step may be a step of causing the multilayer body to pass between a pair of rolls separated from each other by an interval C and pressurizing the multilayer body in the thickness direction.

In other words, the multilayer body pressurizing section may be a section that causes a multilayer body to pass between a pair of rolls separated from each other by an interval C and pressurizes the multilayer body in the thickness direction.

Here, the interval C may be appropriately determined on the basis of the thickness of the multilayer body to be pressurized from the viewpoint of obtaining the target peel strength (or adhesiveness achieved by pressure bonding), and is preferably 0.01 mm or more and 0.40 mm or less, more preferably 0.05 mm or more and 0.30 mm or less, and yet more preferably 0.10 mm or more and 0.25 mm or less, for example.

Pressurizing Conditions

The pressure applied in the thickness direction of the multilayer body (hereinafter this pressure may be referred to as the "pressure-bonding pressure") is preferably 48 MPa or more and 120 MPa or less, more preferably 60 MPa or more and 110 MPa or less, and yet more preferably 80 MPa or more and 100 MPa or less in terms of maximum pressure.

When the pressure-bonding pressure is 48 MPa or more, sufficient adhesiveness is easily obtained by sufficient pressure bonding. When the pressure-bonding pressure is 120 MPa or less, breaking, deformation, etc., of the recording medium during pressurizing are easily suppressed.

The pressure-bonding pressure is measured by a commercially available pressure measuring film. A specific example of the pressure measuring film is a pressure measuring film, PRESCALE produced by FUJIFILM Corporation. Here, the "maximum pressure" is the maximum value observed as the pressure applied to the multilayer body by the multilayer body pressurizing section is changed.

The multilayer body pressurizing section may be a commercially available device. Specific examples thereof include PRESSLE LEADA, PRESSLE CORE, and PRESSLE Bee produced by Toppan Forms Co., Ltd., and PS-500H, PS-500, EX-4100WI, EX-4100W, EX-4100/ 4150, and PS-100 produced by DUPLO SEIKO CORPORATION.

The pressure-bonding step may be performed without heating or with heating.

In other words, the multilayer body pressurizing section may be free of a heating section and may pressurize the multilayer body without heating, or may be equipped with a heating section and may heat the multilayer body while pressurizing.

The method for producing a printed material according to this exemplary embodiment may include additional steps in addition to the aforementioned color image forming step, providing step, bonding step, and pressure-bonding step.

An example of the additional steps is a step of cutting the particle-provided recording medium after the bonding step or a multilayer body after the pressure-bonding step into a desired size.

One Example of Production System and Method

In the description below, one example of a system for producing a printed material according to an exemplary embodiment is described, and a method for producing a printed material according to an exemplary embodiment is described; however, the exemplary embodiments are not limited by the description below.

Figure 3:
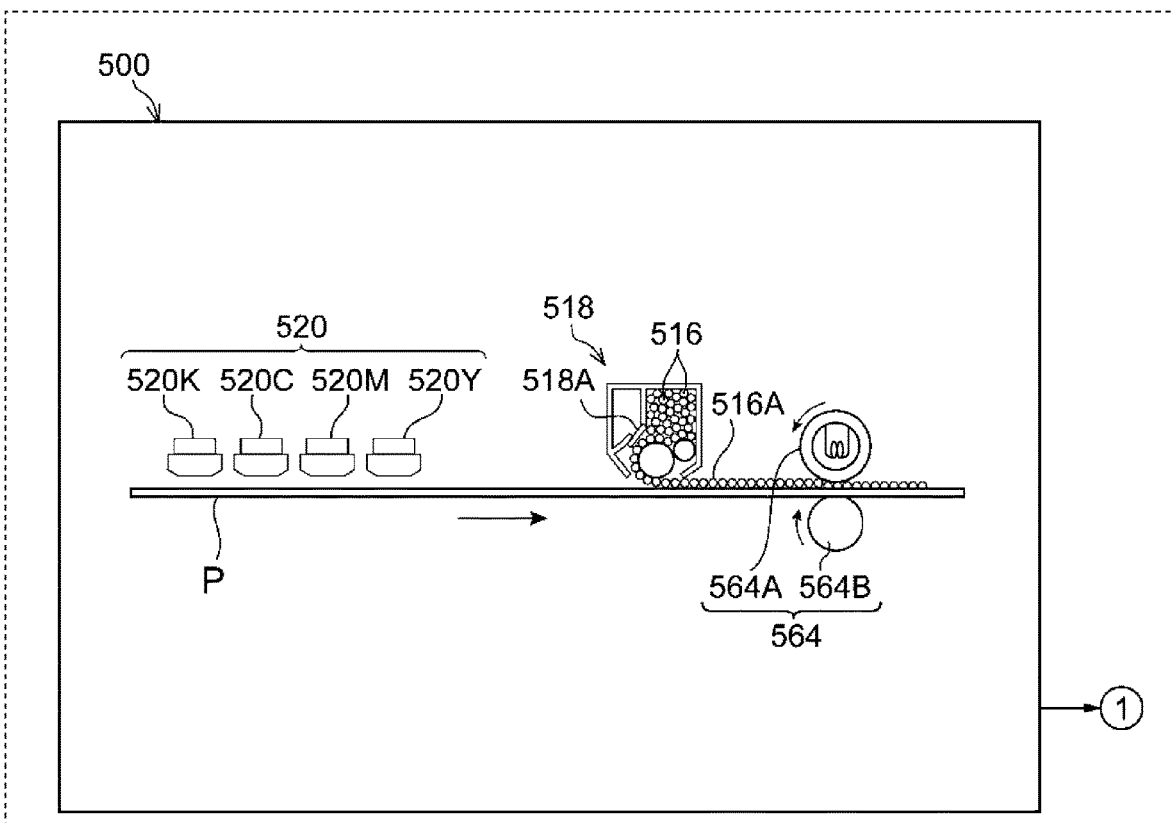
FIG. 3 is a schematic diagram illustrating one example of a system for producing a printed material according to an exemplary embodiment.
Figure 3:
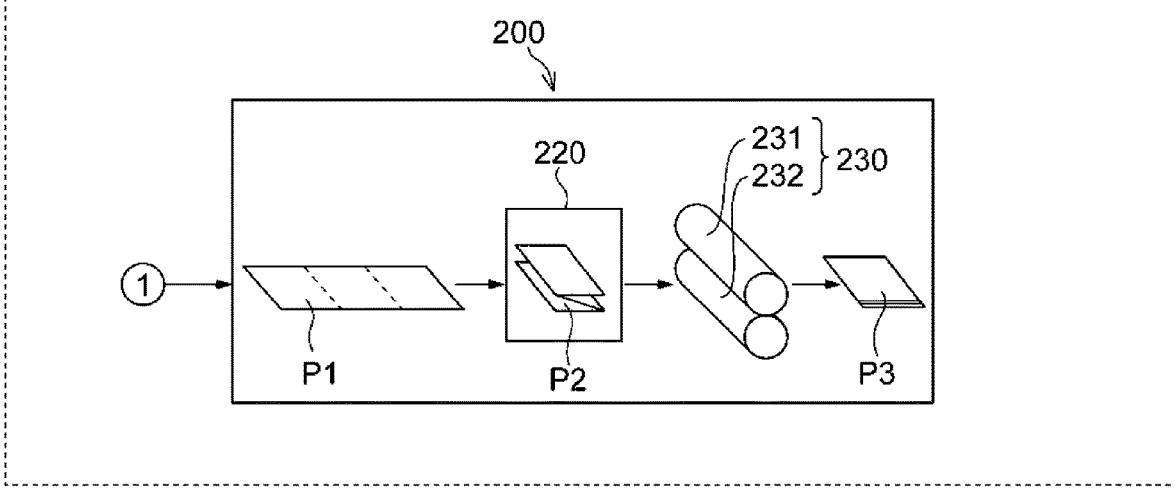

FIG. 3 is a schematic diagram illustrating one example of a system for producing a printed material according to an exemplary embodiment. The system for producing a printed material illustrated in FIG. 3 is equipped with a printing section 500 that forms a color image on and provides particular particles onto a recording medium by an ink jet method, and a pressure-bonding section 200 disposed downstream of the printing section 500. The arrow indicates the direction in which the recording medium is conveyed.

The printing section 500 is equipped with an ink jet recording head 520, which is one example of the color image forming unit, that ejects ink droplets onto a recording medium P to form a color image.

When view from the ink jet recording head 520, a particle providing device 518 that provides particular particles 516 to a surface of a recording medium P is disposed on the downstream in the recording medium P conveying direction (the arrow direction in the drawing). The particle providing apparatus 518 is one example of a providing unit that provides particular particles to a recording medium by an application method.

The printing section 500 includes a recording medium storing unit (not illustrated) that stores the recording medium P, a conveying unit (not illustrated) that conveys the recording medium P stored in the recording medium storing unit, a bonding device 564 that causes ink droplets and particular particles 516 provided to the recording medium P to bond with the recording medium P, and a recording medium discharging unit (not illustrated) that discharges the recording medium P having the ink droplets and the particular particles 516 bonded thereon by the bonding device 564.

The bonding device 564 includes a heating roll 564A having a built-in heating source, and a pressurizing roll 564B that is arranged to oppose the heating roll 564A.

The particle providing device 518 supplies particular particles 516 to the surface of the recording medium P and forms a particular particle region 516A in the surface of the recording medium P.

The particle providing device 518 has a supply roll 518A in a portion opposing the recording medium P, and provides the particular particles 516 to the corresponding application region.

In the particle providing device 518, the particular particles 516 are supplied to the supply roll 518A (conductive roll) to adjust the amount of the particular particles 516 provided to the recording medium P (in other words, the thickness of the layer in the particular particle region 516A having a layer shape provided onto the recording medium P).

The ink jet recording head 520 includes an ink jet recording head 520Y that ejects yellow ink droplets from nozzles, an ink jet recording head 520M that ejects magenta ink droplets from nozzles, an ink jet recording head 520C that ejects cyan ink droplets from nozzles, and an ink jet recording head 520K that ejects black ink droplets from nozzles. The ink jet recording head 520 is driven by a piezoelectric system, a thermal system, or the like.

The ink jet recording head 520 may be a recording head that has a recording width equal to or larger than a region to be recorded and records an image by ejecting droplets onto a recording medium P without moving in a direction intersecting the recording medium P-conveying direction, or may be a recording head that records an image by ejecting droplets onto a recording medium P while moving in a direction intersecting the recording medium P-conveying direction.

The ink ejected from the ink jet recording head 520 may be an aqueous ink or an oil-based ink, and an aqueous ink may be used from the viewpoint of environment. The aqueous ink contains a recording material such as a coloring material and an ink solvent (for example, water or a water-soluble organic solvent). If needed, the aqueous ink may contain other additives.

In the printing section 500, first, the recording medium P is conveyed from the recording medium storing unit by the conveying unit and is delivered to the position of the ink jet recording head 520, and then ink droplets of respective colors are provided onto the recording medium P by the ink jet recording head 520 to form a color image. Next, the recording medium P having the color image formed thereon is conveyed by the conveying unit and is delivered to the position of the particle providing device 518, and then the particular particles 516 are provided to the recording medium P by the particle providing device 518 so as to form a particular particle region 516A.

The recording medium P having the color image and the particular particle region 516A formed thereon is subsequently conveyed to the bonding device 564 (one example of the bonding unit). The pressure applied to the recording medium P from the bonding device 564 may be low compared to the pressure applied to the recording medium P from the pressurizing device 230, and, specifically, may be 0.2 MPa or more and 1 MPa or less. The surface temperature of the recording medium P when heated by the heating roll 564A of the bonding device 564 is preferably 150° C. or more and 220° C. or less, more preferably 155° C. or more and 210° C. or less, and yet more preferably 160° C. or more and 200° C. or less.

As described above, the recording medium P passes the printing section 500, and thus turns into a particle-provided recording medium P1 on which a color image is formed and particular particles are provided.

The particle-provided recording medium P1 is then conveyed toward the pressure-bonding section 200.

In the system for producing a printed material according to this exemplary embodiment, the printing section 500 and the pressure-bonding section 200 may be close to each other or distant from each other.

When the printing section 500 and the pressure-bonding section 200 are distant from each other, the printing section 500 and the pressure-bonding section 200 are, for example, linked via a conveying section (for example, a belt conveyor) that conveys the particle-provided recording medium P1.

The pressure-bonding section 200 is equipped with a folding device 220 and a pressurizing device 230, and folds and pressure-bonds the particle-provided recording medium P1.

The folding device 220 folds the particle-provided recording medium P1 passing through the device to prepare a folded recording medium, in other words, a multilayer body P2.

In the folded recording medium (in other words, a multilayer body), the particular particles provided by the printing section 500 are disposed on at least part of at least one surface of the two opposing surfaces of flaps of the recording medium.

The pressure-bonding section 200 may be equipped with a superimposing device that places an additional recording medium and the particle-provided recording medium on top of each other instead of the folding device 220.

In the recording medium obtained by the superimposing device, in other words, the multilayer body, the particular particles provided by the printing section 500 are disposed on at least part of at least one of the surface of the particle-provided recording medium and the surface of the additional recording medium.

The multilayer body P2 exits the folding device 220 (or superimposing device) and is conveyed toward the pressurizing device 230.

The pressurizing device 230 is equipped with a pair of pressurizing members (in other words, pressurizing rolls 231 and 232). There is, for example, an interval C between the pressurizing roll 231 and the pressurizing roll 232, and as the multilayer body P2 passes between the pair of rolls, a pressure is applied to the multilayer body P2 in the thickness direction. The pair of pressurizing members in the pressurizing device 230 is not limited to the combination of pressurizing rolls and may be a combination of a pressurizing roll and a pressurizing belt or a combination of a pressurizing belt and a pressurizing belt.

The pressurizing device 230 may have therein a heating source (for example, a halogen heater) for heating the multilayer body P2, but this is optional. When the pressurizing device 230 has a heating source inside, the surface temperature of the multilayer body P2 heated by the heating source is preferably 30° C. or more and 120° C. or less, more preferably 40° C. or more and 100° C. or less, and yet more preferably 50° C. or more and 90° C. or less. The pressurizing device 230 may have no heating source inside, and this does not exclude the case in which the temperature inside the pressurizing device 230 increases to a temperature equal to or more than the environment temperature due to heat from a motor in the pressurizing device 230 or the like.

As the multilayer body P2 passing the pressurizing device 230 is pressurized, the superimposed surfaces become bonded with each other with the fluidized particular particles, and a pressure-bonded printed material P3 is obtained.

In the obtained pressure-bonded printed material P3, the opposing surfaces are partly or entirely bonded to each other.

The finished pressure-bonded printed material P3 is discharged from the pressurizing device 230.

A first model of the pressure-bonded printed material P3 is a pressure-bonded printed material in which a folded recording medium has opposing surfaces of flaps bonded to each other with the particular particles.

This pressure-bonded printed material P3 is produced by a system for producing a printed material equipped with a folding device 220.

A second model of the pressure-bonded printed material P3 is a pressure-bonded printed material in which multiple recording media placed on top of each other have opposing surfaces bonded to each other with the particular particles.

This pressure-bonded printed material P3 is produced by a system for producing a pressure-bonded printed material equipped with a superimposing device.

The system for producing a printed material according to this exemplary embodiment is not limited to a type that continuously conveys the multilayer body P2 from the folding device 220 (or superimposing device) to the pressurizing device 230.

The system for producing a printed material according to this exemplary embodiment may be of a type that stocks the multilayer body P2 discharged from the folding device 220 (or superimposing device) and conveys the multilayer body P2 to the pressurizing device 230 after a predetermined amount of the multilayer bodies P2 are stocked.

In the system for producing a printed material according to this exemplary embodiment, the folding device 220 (or superimposing device) and the pressurizing device 230 may be close to each other or distant from each other. When the folding device 220 (or superimposing device) and the pressurizing device 230 are distant from each other, the folding device 220 (or the superimposing device) and the pressurizing device 230 are, for example, linked via a conveying section (for example, a belt conveyor) that conveys the multilayer body P2.

The system for producing a printed material according to this exemplary embodiment may be equipped with a cutting section that cuts the recording medium into a predetermined size. Examples of the cutting section include a cutting section that is disposed between the printing section 300 and the pressure-bonding section 200 and cuts off a part of the particle-provided recording medium P1, the part being a region where no particular particles are placed; a cutting section that is disposed between the folding device 220 and the pressurizing device 230 and cuts off a part of the multilayer body P2, the part being a region where no particular particles are placed; and a cutting section that is disposed downstream of the pressure-bonding section 200 and cuts off a part of the pressure-bonded printed material P3, the part being a region not bonded with the particular particles.

The cutting section may cut off a part of the region where the particular particles are placed.

The system for producing a printed material according to this exemplary embodiment is not limited to a single-sheet type. The system for producing a printed material according to this exemplary embodiment may be of a type that performs a providing step and a pressure-bonding step on a long recording medium to form a long pressure-bonded printed material, and then cuts the long pressure-bonded printed material into a predetermined size.

Figure 4:
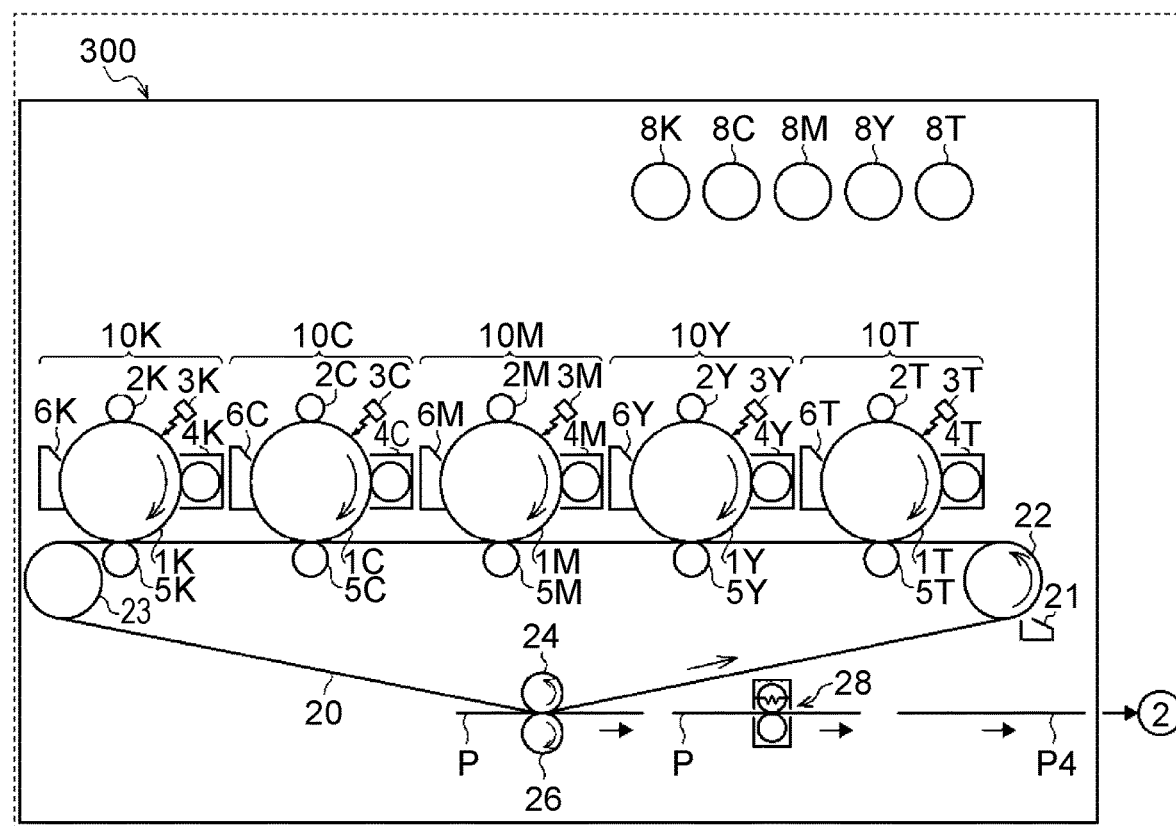
FIG. 4 is a schematic diagram illustrating another example of a system for producing a printed material according to an exemplary embodiment.
Figure 4:
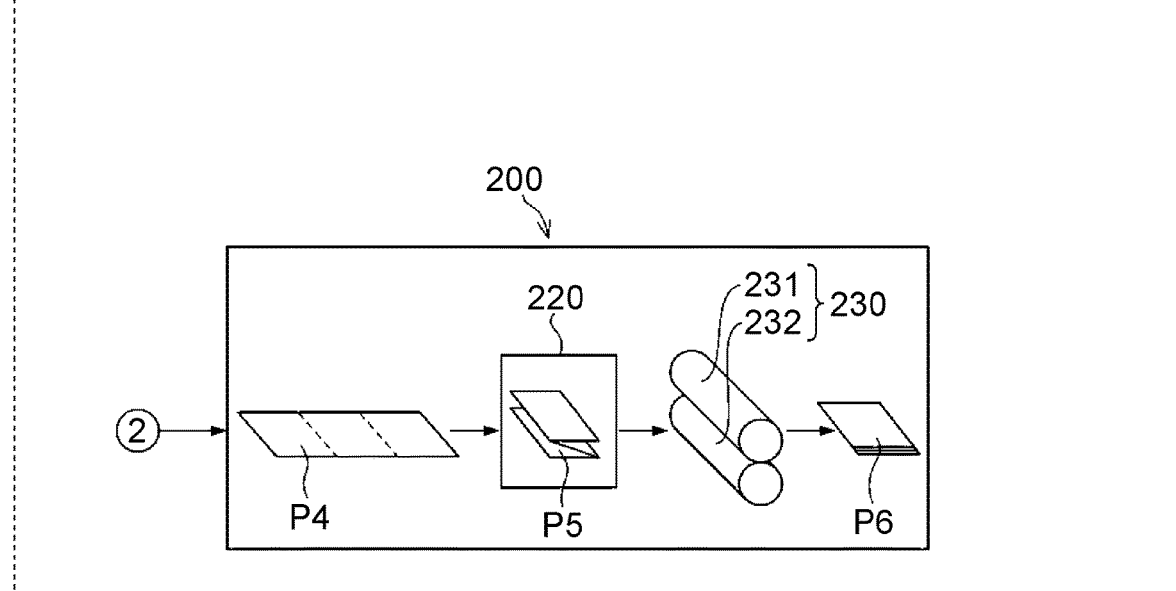

FIG. 4 is a schematic diagram illustrating one example of a system for producing a printed material according to an exemplary embodiment. The system for producing a printed material illustrated in FIG. 4 is equipped with a printing section 300 that forms a color image on and provides particular particles to a recording medium, and a pressure-bonding section 200 disposed downstream of the printing section 300.

The printing section 300 is a five-stand-tandem intermediate transfer-type printing section.

The printing section 300 is equipped with a unit 10T that provides the particular particles (T), and units 10Y, 10M, 10C, and 10K that respectively form yellow (Y), magenta (M), cyan (C), and black (K) images. The unit 10T is a particle providing section (in other words, the providing unit) that provides the particular particles onto a recording medium P by using a developer that contains the particular particles. Each of the units 10Y, 10M, 10C, and 10K is a section that forms a color image (in other words, a color image) on the recording medium P by using a developer that contains a color toner. The units 10T, 10Y, 10M, 10C, and 10K employ an electrophotographic system.

The units 10T, 10Y, 10M, 10C, and 10K are disposed side by side with spaces therebetween in the horizontal direction. The units 10T, 10Y, 10M, 10C, and 10K may each be a process cartridge detachably attachable to the printing section 300.

An intermediate transfer belt (one example of the intermediate transfer body) 20 extends below and throughout the units 10T, 10Y, 10M, 10C, and 10K. The intermediate transfer belt 20 is wound around a driving roll 22, a supporting roll 23, and a counter roll 24 that are in contact with the inner surface of the intermediate transfer belt 20, and runs in a direction from the unit 10T to the unit 10K. An intermediate transfer body cleaning device 21 is installed on the image carrying surface side of the intermediate transfer belt 20 so as to face the driving roll 22.

The units 10T, 10Y, 10M, 10C, and 10K are respectively equipped with developing devices (examples of the developing sections) 4T, 4Y, 4M, 4C, and 4K. Particular particles, a yellow toner, a magenta toner, a cyan toner, and a black toner contained in cartridges 8T, 8Y, 8M, 8C, and 8K are respectively supplied to the developing devices 4T, 4Y, 4M, 4C, and 4K.

Since the units 10T, 10Y, 10M, 10C, and 10K are identical in structure and in operation, the unit 10T that provides the particular particles to the recording medium is described as a representative example.

The unit 10T has a photoreceptor (an example of the image carrier) 1T. A charging roll (one example of the charging section) 2T that charges the surface of the photoreceptor 1T, an exposing device (one example of the electrostatic charge image forming section) 3T that forms an electrostatic charge image by exposing the charged surface of the photoreceptor 1T with a laser beam, a developing device (one example of the developing section) 4T that develops the electrostatic charge image into a particular particle region by supplying the particular particles to the electrostatic charge image, a first transfer roll (one example of the first transfer section) 5T that transfers the developed particular particle region onto the intermediate transfer belt 20, and a photoreceptor cleaning device (one example of the cleaning section) 6T that removes the particular particles remaining on the surface of the photoreceptor 1T after the first transfer are provided in that order around the photoreceptor 1T. The first transfer roll 5T is disposed on the inner side of the intermediate transfer belt 20 and is positioned to face the photoreceptor 1T.

In the description below, operation of providing particular particles to and forming a color image on a recording medium P is described by describing the operation of the unit 10T as an example.

First, the surface of the photoreceptor 1T is charged by the charging roll 2T. The exposing device 3T applies a laser beam onto the charged surface of the photoreceptor 1T in accordance to image data sent from a controller (not illustrated). As a result, an electrostatic charge image, which is the region where the particular particles are to be provided, is formed on the surface of the photoreceptor 1T.

The electrostatic charge image formed on the photoreceptor 1T is rotated to a developing position as the photoreceptor 1T is run. The electrostatic charge image on the photoreceptor 1T is developed by the developing device 4T into a particular particle region.

A developer that contains at least the particular particles and a carrier is stored in the developing device 4T. The particular particles are frictionally charged as they are stirred with a carrier in the developing device 4T, and are retained on the developer roll. As the surface of the photoreceptor 1T passes the developing device 4T, the particular particles electrostatically adhere to the electrostatic charge image on the surface of the photoreceptor 1T, and the electrostatic charge image is thereby developed with the particular particles into a particular particle region. The photoreceptor 1T having a particular particle region thereon is continuously run, and the particular particle region on the photoreceptor 1T is conveyed to a first transfer position.

After the particular particle region on the photoreceptor 1T is conveyed to the first transfer position, a first transfer bias is applied to the first transfer roll 5T. An electrostatic force working from the photoreceptor 1T toward the first transfer roll 5T also works on the particular particle region, and the particular particle region on the photoreceptor 1T is transferred onto the intermediate transfer belt 20. The particular particles remaining on the photoreceptor 1T are removed by the photoreceptor cleaning device 6T and recovered. The photoreceptor cleaning device 6T is, for example, a cleaning blade or a cleaning brush, and is preferably a cleaning brush.

An operation similar to that performed in the unit 10T is also performed in the units 10Y, 10M, 10C, and 10K by using developers that contain color toners. The intermediate transfer belt 20 onto which the particular particle region is transferred in the unit 10T sequentially passes the units 10Y, 10M, 10C, and 10K, and toner images of respective colors are transferred onto the intermediate transfer belt 20 in a superimposing manner.

The intermediate transfer belt 20 onto which a particular particle region and four toner images are superimposed and transferred as the intermediate transfer belt 20 passes the units 10T, 10Y, 10M, 10C, and 10K reaches a second transfer section constituted by the intermediate transfer belt 20, the counter roll 24 in contact with the inner surface of the intermediate transfer belt 20, and a second transfer roll (one example of the second transfer unit) 26 disposed on the image carrying surface side of the intermediate transfer belt 20. Meanwhile, a recording medium P is supplied to a gap where the second transfer roll 26 and the intermediate transfer belt 20 contact each other via a supplying mechanism, and a second transfer bias is applied to the counter roll 24. During this process, an electrostatic force working from the intermediate transfer belt 20 toward the recording medium P acts on the particular particle region and the toner images, and the particular particle region and the toner images on the intermediate transfer belt 20 are transferred onto the recording medium P.

The recording medium P onto which the particular particle region and the toner images have been transferred is conveyed to a heating device (one example of the particle heating section) 28, which is one example of the bonding unit. The color toner images are thermally fixed to the recording medium P by being heated by the heating device 28, and, at the same time, the particular particle region is heated, thereby promoting plasticization of the particular particles.

From the viewpoint of suppressing detachment of the particular particles from the recording medium P, the viewpoint of improving the fixability of the color toners to the recording medium P, and the viewpoint of promoting plasticization of the particular particles, the heating device 28 may be a device that applies both heat and pressure (this device is also referred to as a "heating and pressurizing device").

When the heating device 28 is a heating and pressurizing device, for example, the heating device 28 may be equipped with a heating source such as a halogen heater, and may include a pair of rolls that contact and heat the particular particle region and the toner images on the recording medium P. The color toner images are thermally fixed to the recording medium P as the recording medium having the particular particle region and toner images thereon passes between the pair of rolls, and, at the same time, the particular particle region is heated, thereby promoting plasticization of the particular particles.

As described above, the recording medium P passes the printing section 300, and thus turns into a particle-provided recording medium P4 on which a color image is formed and particular particles are provided.

The particle-provided recording medium P4 is then conveyed toward the pressure-bonding section 200.

In the system for producing a printed material according to this exemplary embodiment, the printing section 300 and the pressure-bonding section 200 may be close to each other or distant from each other.

When the printing section 300 and the pressure-bonding section 200 are distant from each other, the printing section 300 and the pressure-bonding section 200 are, for example, linked via a conveying section (for example, a belt conveyor) that conveys the particle-provided recording medium P4.

As with the pressure-bonding section 200 illustrated in FIG. 3, the pressure-bonding section 200 illustrated in FIG. 4 is equipped with a folding device 220 and a pressurizing device 230 so as to fold the particle-provided recording medium P4 into a multilayer body P5 and pressure-bond the multilayer body P5 to obtain a pressure-bonded printed material P6.

A pressure-bonding section similar to the pressure-bonding section 200 in the system for producing a printed material illustrated in FIG. 3 is used as the pressure-bonding section 200 of the system for producing a printed material illustrated in FIG. 4.

Particular Particles

The particular particles of the exemplary embodiment contain at least base particles and, if needed, an external additive.

In other words, the base particles contained in the particular particles contain: a styrene resin containing styrene and a vinyl monomer other than styrene as polymerization components; and a (meth)acrylic acid ester resin that contains at least two (meth)acrylic acid esters as polymerization components, in which the mass ratio of the (meth)acrylic acid esters relative to the total of polymerization components is 90 mass % or more. In addition, the base particles have at least two glass transition temperatures, and the difference between the highest glass transition temperature and the lowest glass transition temperature is 30° C. or more.

Base Particles

Binder Resin

The base particles contain, as binder resins, a styrene resin containing styrene and a vinyl monomer other than styrene as polymerization components, and a (meth)acrylic acid ester resin that contains at least two (meth)acrylic acid esters as polymerization components, in which the mass ratio of the (meth)acrylic acid esters relative to the total of polymerization components is 90 mass % or more.

In the description below, a "styrene resin that contains styrene and a vinyl monomer other than styrene as polymerization components" may be simply referred to as a "particular styrene resin", and a "(meth)acrylic acid ester resin that contains at least two (meth)acrylic acid esters as polymerization components, in which the mass ratio of the (meth)acrylic acid esters relative to the total of polymerization components is 90 mass % or more" may be simply referred to as a "particular (meth)acrylic acid ester resin".

From the viewpoint of maintaining adhesiveness achieved by pressure bonding, the base particles may contain a larger amount of the particular styrene resin than the particular (meth)acrylic acid ester resin. The amount of the particular styrene resin relative to the total amount of the particular styrene resin and the particular (meth)acrylic acid ester resin is preferably 55 mass % or more and 80 mass % or less, more preferably 60 mass % or more and 75 mass % or less, and yet more preferably 65 mass % or more and 70 mass % or less.

Particular Styrene Resin

The base particles that constitute the particular particles contain a particular styrene resin that contains styrene and a vinyl monomer other than styrene as polymerization components.

From the viewpoint of suppressing fluidization of the particular particles in an unpressured state, the mass ratio of styrene relative to the total of the polymerization components of the particular styrene resin is preferably 60 mass % or more, more preferably 70 mass % or more, and yet more preferably 75 mass % or more.

From the viewpoint of forming particular particles that easily undergo pressure-induced phase transition, the mass ratio of styrene relative to the total of the polymerization components of the particular styrene resin is preferably 95 mass % or less, more preferably 90 mass % or less, and yet more preferably 85 mass % or less.

In other words, the mass ratio of styrene relative to the total of the polymerization components of the particular styrene resin is preferably 60 mass % or more and 95 mass % or less.

Examples of the vinyl monomers other than styrene contained as polymerization components of the styrene resin (hereinafter, such monomers may also be referred to as "other vinyl monomers") include styrene monomers and acryl monomers.

Examples of the styrene monomers used as other vinyl monomers include vinyl naphthalene; alkyl-substituted styrenes such as α-methylstyrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene; aryl-substituted styrenes such as p-phenylstyrene; alkoxy-substituted styrenes such as p-methoxystyrene; halogen-substituted styrenes such as p-chlorostyrene, 3,4-dichlorostyrene, p-fluorostyrene, and 2,5-difluorostyrene; and nitro-substituted styrenes such as m-nitrostyrene, o-nitrostyrene, and p-nitrostyrene.

These styrene monomers may be used alone or in combination.

The acryl monomer used as other vinyl monomers may be at least one acryl monomer selected from the group consisting of (meth)acrylic acid and (meth)acrylic acid esters. Examples of the (meth)acrylic acid esters include (meth) acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

These acryl monomers may be used alone or in combination.

Examples of the (meth)acrylic acid alkyl esters include methyl (meth)acrylate, ethyl (meth)acrylate, propyl (meth) acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth) acrylate, cyclohexyl (meth)acrylate, dicyclopentanyl (meth) acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth) acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth)acrylate, and methoxypolyethylene glycol (meth)acrylate.

Examples of other vinyl monomers contained as polymerization components of the particular styrene resin include, in addition to the styrene monomers and acryl-based monomers, (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene.

From the viewpoint of forming particular particles that easily undergo pressure-induced phase transition, the other vinyl monomers contained as polymerization components of the particular styrene resin preferably contain a (meth) acrylic acid ester, more preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

From the viewpoint of forming particular particles that easily undergo pressure-induced phase transition, the other vinyl monomers contained as polymerization components of the particular styrene resin particularly preferably contain at least one of n-butyl acrylate and 2-ethylhexyl acrylate.

From the viewpoint of forming particular particles that easily undergo pressure-induced phase transition, the particular styrene resin and the particular (meth)acrylic acid ester resin described below may contain the same (meth) acrylic acid ester as a polymerization component.

From the viewpoint of suppressing fluidization of the particular particles in an unpressured state, the mass ratio of the (meth)acrylic acid ester relative to the total of the polymerization components of the particular styrene resin is preferably 40 mass % or less, more preferably 30 mass % or less, and yet more preferably 25 mass % or less. From the viewpoint of forming particular particles that easily undergo pressure-induced phase transition, the mass ratio is preferably 5 mass % or more, more preferably 10 mass % or more, and yet more preferably 15 mass % or more. The (meth) acrylic acid ester here is preferably a (meth)acrylic acid alkyl ester, yet more preferably a (meth)acrylic acid alkyl ester in which the alkyl group contains 2 to 10 carbon atoms, and still more preferably a (meth)acrylic acid alkyl ester in which the alkyl group contains 4 to 8 carbon atoms.

The particular styrene resin particularly preferably contains, as a polymerization component, at least one of n-butyl acrylate and 2-ethylhexyl acrylate, and the total amount of n-butyl acrylate and 2-ethylhexyl acrylate relative to the total of polymerization components of the styrene resin is preferably 40 mass % or less, more preferably 30 mass % or less, and yet more preferably 25 mass % or less from the viewpoint of suppressing fluidization of the particles in an unpressured state. From the viewpoint of forming particular particles that easily undergo pressure-induced phase transition, the total amount is preferably 5 mass % or more, more preferably 10 mass % or more, and yet more preferably 15 mass % or more.

From the viewpoint of suppressing fluidization of the particular particles in an unpressured state, the weight-average molecular weight of the particular styrene resin is preferably 3000 or more, more preferably 4000 or more, and yet more preferably 5000 or more. From the viewpoint of forming particular particles that easily undergo pressure-induced phase transition, the weight-average molecular weight is preferably 60000 or less, more preferably 55000 or less, and yet more preferably 50000 or less.

In the present disclosure, the weight-average molecular weight of a resin is measured by gel permeation chromatography (GPC). The molecular weight measurement by GPC is conducted by using HLC-8120GPC produced by TOSOH CORPORATION as a GPC instrument with columns, TSKgel Super HM-M (15 cm) produced by TOSOH CORPORATION, and tetrahydrofuran as a solvent. The weight-average molecular weight of a resin is calculated by using a molecular weight calibration curve prepared by using monodisperse polystyrene standard samples.

From the viewpoint of suppressing fluidization of the particular particles in an unpressured state, the glass transition temperature of the particular styrene resin is preferably 30° C. or more, more preferably 40° C. or more, and yet more preferably 50° C. or more. From the viewpoint of forming particular particles that easily undergo pressure-induced phase transition, the glass transition temperature is preferably 110° C. or less, more preferably 100° C. or less, and yet more preferably 90° C. or less.

In the present disclosure, the glass transition temperature of a resin is determined from a differential scanning calorimetry curve (DSC curve) obtained by performing differential scanning calorimetry (DSC). More specifically, the glass transition temperature is determined from the "extrapolated glass transition onset temperature" described in the method for determining the glass transition temperature in JIS K 7121:1987 "Testing Methods for Transition Temperatures of Plastics".

The glass transition temperature of a resin is controlled by the types of polymerization components and the polymerization ratios. The glass transition temperature has a tendency to decrease as the density of flexible units, such as a methylene group, an ethylene group, and an oxyethylene group, contained in the main chain increases, and has a tendency to increase as the density of rigid units, such as aromatic rings and cyclohexane rings, contained in the main chain increases. Moreover, the glass transition temperature has a tendency to decrease as the density of aliphatic groups in side chains increases.

From the viewpoint of suppressing fluidization of the particular particles in an unpressured state, the mass ratio of the particular styrene resin relative to the entire base particles is preferably 55 mass % or more, more preferably 60 mass % or more, and yet more preferably 65 mass % or more. From the viewpoint of forming particular particles that easily undergo pressure-induced phase transition, the mass ratio is preferably 80 mass % or less, more preferably 75 mass % or less, and yet more preferably 70 mass % or less.

Particular (Meth)Acrylic Acid Ester Resin

The base particles constituting the particular particles contain at least two (meth)acrylic acid esters as polymerization components, and the mass ratio of the (meth)acrylic acid esters relative to the total of polymerization components is 90 mass % or more.

The mass ratio of the (meth)acrylic acid esters relative to the total of the polymerization components of the (meth) acrylic acid ester resin is 90 mass % or more, preferably 95 mass % or more, more preferably 98 mass % or more, and yet more preferably 100 mass %.

Examples of the (meth)acrylic acid esters include (meth) acrylic acid alkyl esters, (meth)acrylic acid carboxy-substituted alkyl esters, (meth)acrylic acid hydroxy-substituted alkyl esters, (meth)acrylic acid alkoxy-substituted alkyl esters, and di(meth)acrylic acid esters.

Examples of the (meth)acrylic acid alkyl esters include methyl (meth)acrylate, ethyl (meth)acrylate, propyl (meth) acrylate, isopropyl (meth)acrylate, n-butyl (meth)acrylate, isobutyl (meth)acrylate, n-hexyl (meth)acrylate, 2-ethylhexyl (meth)acrylate, lauryl (meth)acrylate, stearyl (meth) acrylate, cyclohexyl (meth)acrylate, dicyclopentanyl (meth) acrylate, and isobornyl (meth)acrylate.

An example of the (meth)acrylic acid carboxy-substituted alkyl ester is 2-carboxylethyl (meth)acrylate.

Examples of the (meth)acrylic acid hydroxy-substituted alkyl esters include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth) acrylate, and 4-hydroxybutyl (meth)acrylate.

An example of the (meth)acrylic acid alkoxy-substituted alkyl ester is 2-methoxyethyl (meth)acrylate.

Examples of the di(meth)acrylic acid esters include ethylene glycol di(meth)acrylate, diethylene glycol di(meth) acrylate, triethylene glycol di(meth)acrylate, butanediol di(meth)acrylate, pentanediol di(meth)acrylate, hexanediol di(meth)acrylate, nonanediol di(meth)acrylate, and decanediol di(meth)acrylate.

Examples of the (meth)acrylic acid esters also include 2-(diethylamino)ethyl (meth)acrylate, benzyl (meth)acrylate, and methoxypolyethylene glycol (meth)acrylate.

These (meth)acrylic acid esters may be used alone or in combination.

From the viewpoint of forming particular particles that easily undergo pressure-induced phase transition and have excellent adhesiveness achieved by pressure bonding, the (meth)acrylic acid esters are preferably (meth)acrylic acid alkyl esters, yet more preferably (meth)acrylic acid alkyl esters in which the alkyl group contains 2 to 10 carbon atoms, still more preferably (meth)acrylic acid alkyl esters in which the alkyl group contains 4 to 8 carbon atoms, and particularly preferably n-butyl acrylate and 2-ethylhexyl acrylate.

As described above, from the viewpoint of forming particular particles that easily undergo pressure-induced phase transition, the particular (meth)acrylic acid ester resin and the particular styrene resin may contain the same (meth) acrylic acid ester as a polymerization component.

From the viewpoint of forming particular particles that easily undergo pressure-induced phase transition and have excellent adhesiveness achieved by pressure bonding, the mass ratio of the (meth)acrylic acid alkyl esters relative to the total of the polymerization components of the particular (meth)acrylic acid ester resin is preferably 90 mass % or more, more preferably 95 mass % or more, yet more preferably 98 mass % or more, and still more preferably 100 mass %. The (meth)acrylic acid alkyl esters here preferably each have an alkyl group containing 2 to 10 carbon atoms and more preferably each have an alkyl group containing 4 to 8 carbon atoms.

From the viewpoint of forming particular particles that easily undergo pressure-induced phase transition and have excellent adhesiveness achieved by pressure bonding, the mass ratio between two (meth)acrylic acid esters having the largest and second-largest mass ratios among the at least two (meth)acrylic acid esters contained as polymerization components in the particular (meth)acrylic acid ester resin is preferably 80:20 to 20:80, more preferably 70:30 to 30:70, and yet more preferably 60:40 to 40:60.

The two (meth)acrylic acid esters having the largest and second-largest mass ratios among the at least two (meth) acrylic acid esters contained as polymerization components in the particular (meth)acrylic acid ester resin are preferably (meth)acrylic acid alkyl esters. The (meth)acrylic acid alkyl esters here preferably each have an alkyl group having 2 to 10 carbon atoms and more preferably each have an alkyl group containing 4 to 8 carbon atoms.

When the two (meth)acrylic acid esters having the largest and second-largest mass ratios among the at least two (meth)acrylic acid esters contained as polymerization components in the particular (meth)acrylic acid ester resin are (meth)acrylic acid alkyl esters, from the viewpoint of forming particular particles that easily undergo pressure-induced phase transition and have excellent adhesiveness achieved by pressure bonding, the difference in the number of carbon atoms in the alkyl group between the two (meth)acrylic acid alkyl esters is preferably 1 to 4, more preferably 2 to 4, and yet more preferably 3 or 4.

From the viewpoint of forming particular particles that easily undergo pressure-induced phase transition and have excellent adhesiveness achieved by pressure bonding, the particular (meth)acrylic acid ester resin preferably contains, as polymerization components, n-butyl acrylate and 2-ethylhexyl acrylate. In particular, the two (meth)acrylic acid esters having the largest and second-largest mass ratios among the at least two (meth)acrylic acid esters contained as polymerization components in the (meth)acrylic acid ester resin are preferably n-butyl acrylate and 2-ethylhexyl acrylate. The total amount of n-butyl acrylate and 2-ethylhexyl acrylate relative to the total of the polymerization components of the (meth)acrylic acid ester resin is preferably 90 mass or more, more preferably 95 mass or more, yet more preferably 98 mass or more, and still more preferably 100 mass %.

The particular (meth)acrylic acid ester resin may further contain, as polymerization components, vinyl monomers other than (meth)acrylic acid esters.

Examples of the vinyl monomers other than the (meth)acrylic acid esters include (meth)acrylic acid; styrene; styrene monomers other than styrene; (meth)acrylonitrile; vinyl ethers such as vinyl methyl ether and vinyl isobutyl ether; vinyl ketones such as vinyl methyl ketone, vinyl ethyl ketone, and vinyl isopropenyl ketone; and olefins such as isoprene, butene, and butadiene. These vinyl monomers may be used alone or in combination.

When the particular (meth)acrylic acid ester resin contains, as a polymerization component, a vinyl monomer other than (meth)acrylic acid esters, the vinyl monomer other than the (meth)acrylic acid esters is preferably at least one of acrylic acid and methacrylic acid and is more preferably acrylic acid.

From the viewpoint of suppressing fluidization of particles in an unpressured state, the weight-average molecular weight of the particular (meth)acrylic acid ester resin is preferably 50,000 or more, more preferably 100,000 or more, and yet more preferably 120,000 or more. From the viewpoint of forming particles that easily undergo pressure-induced phase transition, the weight-average molecular weight is preferably 250,000 or less, more preferably 220,000 or less, and yet more preferably 200,000 or less.

From the viewpoint of forming particles that easily undergo pressure-induced phase transition, the glass transition temperature of the particular (meth)acrylic acid ester resin is preferably 10° C. or less, more preferably 0° C. or less, and yet more preferably −10° C. or less. From the viewpoint of suppressing fluidization of particles in an unpressured state, the glass transition temperature is preferably −90° C. or more, more preferably −80° C. or more, and yet more preferably −70° C. or more.

In this exemplary embodiment, from the viewpoint of forming particles that easily undergo pressure-induced phase transition, the mass ratio of the particular (meth)acrylic acid ester resin relative to the entire base particles is preferably 20 mass % or more, more preferably 25 mass % or more, and yet more preferably 30 mass % or more. From the viewpoint of suppressing fluidization of particles in an unpressured state, the mass ratio is preferably 45 mass % or less, more preferably 40 mass % or less, and yet more preferably 35 mass % or less.

In this exemplary embodiment, the total amount of the particular styrene resin and the particular (meth)acrylic acid ester resin contained in the base particles relative to the entire base particles is preferably 70 mass % or more, more preferably 80 mass % or more, yet more preferably 90 mass % or more, still preferably 95 mass % or more, and most preferably 100 mass %.

If needed, the base particles may contain polystyrene, non-vinyl-based resins such as epoxy resins, polyester resins, polyurethane resins, polyamide resins, cellulose resins, polyether resins, and modified rosin, or the like.

These resins may be used alone or in combination.

Other Components

The base particles may contain other components as necessary.

Examples of other components include coloring agents (for example, pigments and dyes), releasing agents (for example, hydrocarbon wax; natural wax such as carnauba wax, rice wax, and candelilla wax; synthetic or mineral or petroleum wax such as montan wax; and ester wax such as fatty acid esters and montanic acid esters), and charge controlling agents.

The particular particles may contain a coloring agent as long as the visibility of the image is not impaired.

From the viewpoint of enhancing the transparency of the particular particles, the amount of the coloring agent in the base particles may be as small as possible. Specifically, the amount of the coloring agent relative to the entire base particles is preferably 1.0 mass % or less, more preferably 0.1 mass % or less, yet more preferably 0.01 mass % or less, and still more preferably zero.

The particular particles may be transparent.

In this exemplary embodiment, "transparent" means that the average transmittance of the region in which the particular particles are provided is 10% or more for light in the visible range (400 nm or more and 700 nm or less). The average transmittance is preferably 50% or more, more preferably 80% or more, and yet more preferably 90% or more.

The average transmittance is measured with a spectrophotometer V700 (produced by JASCO Corporation).

Structure of Base Particles

The inner structure of the base particles may be a sea-island structure.

The sea-island structure may be a sea-island structure that has a sea phase containing one of the two or more binder resins, and island phases being dispersed in the sea phase and containing another one of the two or more binder resins. From the viewpoint of inducing the pressure-induced phase transition, more specifically, a sea-island structure that includes a sea phase containing a particular styrene resin and island phases dispersed in the sea phase and containing a particular (meth)acrylic acid ester resin is preferable. The details of the particular styrene resin contained in the sea phase and the (meth)acrylic acid ester resin contained in the island phases are as described above. Alternatively, island phases not containing a (meth)acrylic acid ester resin may be dispersed in the sea phase.

When the base particles have a sea-island structure, the average size of the island phases may be 200 nm or more and 500 nm or less. When the average size of the island phases is 500 nm or less, the base particles easily undergo pressure-induced phase transition. When the average size of the island phases is 200 nm or more, excellent mechanical strength desired for the base particles (for example, the strength that withstands deformation during stirring in a developing device) is exhibited. From these viewpoints, the average size of the island phases is more preferably 220 nm or more and 450 nm or less and yet more preferably 250 nm or more and 400 nm or less.

Examples of the method for controlling the average size of the island phases of the sea-island structure to be within the aforementioned range include increasing or decreasing the amount of the particular (meth)acrylic acid ester resin relative to the amount of the particular styrene resin and increasing or decreasing the length of time of maintaining a high temperature in the step of fusing and coalescing aggregated particles in the method for producing base particles described below.

The sea-island structure is confirmed and the average size of the island phases is measured as follows.

The particular particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). The sea phase and the island phases of the sea-island structure are distinguished by the shade created by the degree of staining with osmium tetroxide or ruthenium tetroxide, and the presence or absence of the sea-island structure is identified by the shade. From an SEM image, one hundred island phases are selected at random, a long axis of each island phase is measured, and the average of one hundred long axes is used as the average size.

The base particles may be a single-layer-structure base particles, or core-shell-structure base particles each constituted by a core and a shell layer coating the core. From the viewpoint of suppressing fluidization of the particular particles in an unpressured state, the base particles may have a core-shell structure.

From the viewpoint of inducing the phase transition under pressure, when the base particles have a core-shell structure, the core may contain the particular styrene resin and the particular (meth)acrylic acid ester resin. From the viewpoint of suppressing fluidization of the particular particles in an unpressured state, the shell layer may contain the particular styrene resin.

When the base particles have a core-shell structure, the core may have a sea phase containing the particular styrene resin and island phases containing the particular (meth) acrylic acid ester resin dispersed in the sea phase. The average size of the island phases may be within the aforementioned range. In addition to the core having the above-described structure, the shell layer may contain the particular styrene resin. In such a case, the sea phase of the core and the shell layer form a continuous structure, and the base particles easily undergo pressure-induced phase transition.

Examples of the resin contained in the shell layer also include polystyrene, and non-vinyl resins such as epoxy resins, polyester resins, polyurethane resins, polyamide resins, cellulose resins polyether resins, and modified rosin.

These resins may be used alone or in combination.

From the viewpoint of suppressing deformation of the base particles, the average thickness of the shell layer is preferably 120 nm or more, more preferably 130 nm or more, and yet more preferably 140 nm or more. From the viewpoint of inducing the phase transition of the base particles under pressure, the average thickness is preferably 550 nm or less, more preferably 500 nm or less, and yet more preferably 400 nm or less.

The average thickness of the shell layer is measured by the following method.

The particles are embedded in an epoxy resin, a section is prepared by using a diamond knife or the like, and the prepared section is stained with osmium tetroxide or ruthenium tetroxide in a desiccator. The stained section is observed with a scanning electron microscope (SEM). From an SEM image, ten base particle sections are selected at random, the thickness of the shell layer is measured at twenty positions per base particle, and the average thickness is calculated. The average value of ten base particles is used as the average thickness.

From the viewpoint of ease of handling the base particles, the volume-average particle diameter (D50v) of the base particles is preferably 4 μm or more, more preferably 5 μm or more, and yet more preferably 6 μm or more. The volume-average particle diameter of the base particles is preferably 15 μm or less, more preferably 12 μm or less, and yet more preferably 10 μm or less.

The volume-average particle diameter (D50v) of the base particles is determined by using a Coulter MULTISIZER II (produced by Beckman Coulter Inc.) with apertures having an aperture diameter of 100 μm. Into 2 mL of a 5 mass aqueous sodium alkyl benzenesulfonate solution, 0.5 mg or more and 50 mg or less of base particles are added and dispersed, and then the resulting dispersion is mixed with 100 mL or more and 150 mL or less of an electrolyte (ISOTON-II produced by Beckman Coulter Inc.). The resulting mixture is dispersed for 1 minute in an ultrasonic disperser, and the obtained dispersion is used as a sample. The particle diameters of 50000 particles having a particle diameter of 2 μm or more and 60 μm or less in the sample are measured. The particle diameter at 50%; accumulation in a volume-based particle size distribution calculated from the small diameter side is used as the volume-average particle diameter (D50v).

External Additive

An example of the external additive is inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobizing involves, for example, immersing inorganic particles in a hydrophobizing agent. The hydrophobizing agent may be any, and examples thereof include silane coupling agents, silicone oils, titanate coupling agents, and aluminum coupling agents. These may be used alone or in combination. The amount of the hydrophobizing agent is, for example, 1 part by mass or more and 10 parts by mass or less relative to 100 parts by mass of the inorganic particles.

Other examples of the external additive include resin particles (resin particles of polystyrene, polymethyl methacrylate, melamine resin, etc.), and cleaning activating agents (for example, particles of metal salts of higher aliphatic acids such as zinc stearate and fluorine-based high-molecular-weight materials).

The externally added amount of the external additive is preferably 0.01 mass % or more and 5 mass % or less and is more preferably 0.01 mass % or more and 2.0 mass % or less relative to the base particles.

Properties of Particular Particles

The particular particles have at least two glass transition temperatures, one of which is presumably derived from one of the two or more binder resins, and another one of which is presumably derived from another one of the two or more binder resins. As described above, when binder resins contain a particular styrene resin and a particular (meth)acrylic acid ester resin, one of the glass transition temperatures is presumed to be that of the styrene resin, and another glass transition temperature is presumed to be that of the (meth) acrylic acid ester resin.

The particular particles may have three or more glass transition temperatures; however, the number of glass transition temperatures is preferably two. Examples of the case in which there are two glass transition temperatures include the case in which a particular styrene resin and a particular (meth)acrylic acid ester resin are the only resins contained in the particular particles, and the case in which the amount of resins other than the particular styrene resin and the particular (meth)acrylic acid ester resin is small (for example, the amount of other resins is 5 mass % or less relative to the entire particular particles).

The particular particles have at least two glass transition temperatures, and the difference between the lowest glass transition temperature and the highest glass transition temperature is 30° C. or more. From the viewpoint of inducing the particles to undergo phase transition under pressure, the difference between the lowest glass transition temperature and the highest glass transition temperature is preferably 40° C. or more, yet more preferably 50° C. or more, and still more preferably 60° C. or more. The upper limit of the difference between the highest glass transition temperature and the lowest glass transition temperature is, for example, 140° C. or less, and may be 130° C. or less or 120° C. or less.

From the viewpoint of inducing the particles to undergo phase transition under pressure, the lowest glass transition temperature of the particular particles is preferably 10° C. or less, more preferably 0° C. or less, and yet more preferably –10° C. or less. From the viewpoint of suppressing fluidization of particles in an unpressured state, the lowest glass transition temperature is preferably –90° C. or more, more preferably –80° C. or more, and yet more preferably –70° C. or more.

From the viewpoint of suppressing fluidization of particles in an unpressured state, the highest glass transition temperature of the particular particles is preferably 30° C. or more, more preferably 40° C. or more, and yet more preferably 50° C. or more. From the viewpoint of inducing particles to undergo phase transition under pressure, the highest glass transition temperature is preferably 70° C. or less, more preferably 65° C. or less, and yet more preferably 60° C. or less.

In the present disclosure, the glass transition temperatures of the particular particles are determined from a differential scanning calorimetry curve (DSC curve) obtained by performing differential scanning calorimetry (DSC) on a plate-shaped sample prepared by compressing the resin particles. More specifically, the glass transition temperature is determined from the "extrapolated glass transition onset temperature" described in the method for determining the glass transition temperature in JIS K 7121:1987 "Testing Methods for Transition Temperatures of Plastics".

The particular particles are particles that undergo phase transition under pressure, and satisfy formula 1 below:

$$10° C. \leq T1 - T2 \qquad \text{Formula 1:}$$

In formula 1, T1 represents a temperature at which the viscosity is 10000 Pa·s at a pressure of 1 MPa, and T2 represents a temperature at which the viscosity is 10000 Pa·s at a pressure of 10 MPa. The method for determining T1 and T2 is described below.

From the viewpoint of inducing phase transition of particles under pressure, the temperature difference (T1–T2) is preferably 10° C. or more, more preferably 15° C. or more, and yet more preferably 20° C. or more. From the viewpoint of suppressing fluidization of the particular particles in an unpressured state, the temperature difference (T1–T2) is preferably 120° C. or less, more preferably 100° C. or less, and yet more preferably 80° C. or less.

The value of T1 is preferably 140° C. or less, more preferably 130° C. or less, yet more preferably 120° C. or less, and still more preferably 115° C. or less. The lower limit of the temperature T1 is preferably 80° C. or more and more preferably 85° C. or more.

The value of T2 is preferably 40° C. or more, more preferably 50° C. or more, and yet more preferably 60° C. or more. The upper limit of the temperature T2 may be 85° C. or less.

One indicator of how easily the particular particles undergo pressure-induced phase transition is the temperature difference (T1–T3) between the temperature T1 at which the viscosity is 10000 Pa·s at a pressure of 1 MPa and the temperature T3 at which the viscosity is 10000 Pa·s at a pressure of 4 MPa. The temperature difference (T1–T3) may be 5° C. or more. The temperature difference $(T_1-T_2)$ is typically 25° C. or less.

From the viewpoint of inducing the phase transition under pressure, the temperature difference $(T_1-T_2)$ of the particular particles is preferably 5° C. or more and more preferably 10° C. or more.

The upper limit of the temperature difference (T1–T3) is typically 25° C. or less.

From the viewpoint of adjusting the temperature difference (T1–T3) to 5° C. or more, the temperature T3 at which the particular particles show a viscosity of 10000 Pa·s at a pressure of 4 MPa is preferably 90° C. or less, more preferably 85° C. or less, and yet more preferably 80° C. or less. The lower limit of the temperature T3 may be 60° C. or more.

The method for determining the temperature T1, the temperature T2, and the temperature T3 is as follows.

Particular particles are compressed into a pellet-shaped sample. The pellet-shaped sample is placed in a Flowtester (CFT-500 produced by Shimadzu Corporation), the applied pressure is fixed at 1 MPa, and the viscosity at 1 MPa relative to the temperature is measured. From the obtained viscosity graph, the temperature T1 at which the viscosity is $10^4$ Pa·s at an applied pressure of 1 MPa is determined. The temperature T2 is determined as with the method for determining the temperature T1 except that the applied pressure is changed from 1 MPa to 10 MPa. The temperature T3 is determined as with the method for determining the temperature T1 except that the applied pressure is changed from 1 MPa to 4 MPa. The temperature difference (T1–T2) is calculated from the temperature T1 and the temperature T2. The temperature difference (T1–T3) is calculated from the temperature T1 and the temperature T3.

Method for Producing Particular Particles

The particular particles are obtained by first producing base particles and then externally adding an external additive to the base particles.

The base particles may be produced by a dry method (for example, a kneading and pulverizing method) or a wet method (for example, an aggregation and coalescence method, a suspension polymerization method, or a dissolution suspension method). There is no limitation on these methods, and any known method may be employed. Among these methods, the aggregation and coalescence method may be employed to produce base particles.

In the description below, a method for producing base particles by an aggregation and coalescence method is described as one example.

When the base particles are to be produced by the aggregation and coalescence method, the base particles are produced through, for example, the following steps:

- a step of preparing a styrene resin particle dispersion in which styrene resin particles containing a particular styrene resin are dispersed (styrene resin particle dispersion preparation step);
- a step of polymerizing a particular (meth)acrylic acid ester resin in the styrene resin particle dispersion so as to form composite resin particles containing the particular styrene resin and the particular (meth)acrylic acid ester resin (composite resin particle forming step);
- a step aggregating the composite resin particles in the composite resin particle dispersion in which the composite resin particles are dispersed so as to form aggregated particles (aggregated particle forming step); and
- a step of heating the aggregated particle dispersion in which the aggregated particles are dispersed so as to fuse and coalesce the aggregated particles and thereby form base particles (fusing and coalescing step).

These steps will now be described in detail.

In the description below, a method for obtaining base particles free of any releasing agent is described. A releasing agent and other additives may be used as needed.

When a coloring agent and/or a releasing agent is to be contained in the base particles, in the aggregated particle forming step, a coloring agent particle dispersion and/or a releasing agent particle dispersion is mixed with the composite resin particle dispersion so as to aggregate the composite resin particles with the coloring agent and/or releasing agent to form aggregated particles.

The coloring agent particle dispersion and the releasing agent particle dispersion can each be prepared by, for example, mixing a coloring agent or a releasing agent with a dispersion medium and then performing a dispersing treatment in a known disperser machine.

Styrene Resin Particle Dispersion Preparation Step

In the styrene resin particle dispersion preparation step, a styrene resin particle dispersion in which styrene resin particles containing a particular styrene resin are dispersed is prepared.

The styrene resin particle dispersion is, for example, prepared by dispersing styrene resin particles in a dispersion medium by using a surfactant.

Examples of the dispersion medium include aqueous media such as water and alcohols. These may be used alone or in combination.

Examples of the surfactant include anionic surfactants such as sulfate esters, sulfonates, phosphate esters, and soaps; cationic surfactants such as amine salts and quaternary ammonium salts; and nonionic surfactants such as polyethylene glycol, alkyl phenol-ethylene oxide adducts, and polyhydric alcohols. A nonionic surfactant may be used in combination with an anionic surfactant or a cationic surfactant. Among these, an anionic surfactant may be used. The surfactants may be used alone or in combination.

Examples of the method for dispersing the styrene resin particles in a dispersion medium include methods that involve mixing a particular styrene resin and a dispersion medium and then dispersing the resin by stirring in a rotational shear-type homogenizer, or a mill that uses media such as a ball mill, a sand mill, or a dyno mill.

Another example of the method for dispersing styrene resin particles in a dispersion medium is an emulsion polymerization method. Specifically, after polymerization components of a particular styrene resin, and a chain transfer agent or a polymerization initiator are mixed, an aqueous medium containing a surfactant is further added to the resulting mixture, the resulting mixture is stirred to prepare an emulsion, and the styrene resin is polymerized in the emulsion. Here, the chain transfer agent may be dodecanethiol.

The volume-average particle diameter of the styrene resin particles dispersed in the styrene resin particle dispersion is preferably 100 nm or more and 250 nm or less, more preferably 120 nm or more and 220 nm or less, and yet more preferably 150 nm or more and 200 nm or less.

The volume-average particle diameter (D50v) of the resin particles contained in the resin particle dispersion is determined by measuring the particle diameter with a laser diffraction scattering particle size distribution meter (for example, LA-700 produced by Horiba Ltd.) and determining the particle diameter at 50% accumulation in a volume-basis particle size distribution calculated from the small diameter side.

The amount of the styrene resin particles in the styrene resin particle dispersion relative to the total mass of the styrene resin particle dispersion is preferably 30 mass % or more and 60 mass % or less and is more preferably 40 mass % or more and 50 mass % or less.

Composite Resin Particle Forming Step

In the composite resin particle forming step, the particular (meth)acrylic acid ester resin is polymerized in the styrene resin particle dispersion so as to form composite resin particles containing the particular styrene resin and the particular (meth)acrylic acid ester resin.

In the composite resin particle forming step, the styrene resin particle dispersion and polymerization components of the particular (meth)acrylic acid ester resin are mixed, and the particular (meth)acrylic acid ester resin is polymerized in the styrene resin particle dispersion so as to form composite resin particles containing the particular styrene resin and the particular (meth)acrylic acid ester resin.

The composite resin particles may be resin particles containing a particular styrene resin and a particular (meth)acrylic acid ester resin that are in a microphase-separated state. The resin particles are produced by the following method, for example.

To a styrene resin particle dispersion, polymerization components (a group of monomers including at least two (meth)acrylic acid esters) of a particular (meth)acrylic acid ester resin are added, and, if needed, an aqueous medium is added thereto. Next, while slowly stirring the dispersion, the temperature of the dispersion is elevated to a temperature higher than or equal to the glass transition temperature of the particular styrene resin (for example, a temperature 10° C. to 30° C. higher than the glass transition temperature of the particular styrene resin). Next, while maintaining the temperature, an aqueous medium containing a polymerization initiator is slowly added dropwise, and then stirring is continued for a long time within the range of 1 to 15 hours. Here, the polymerization initiator may be ammonium persulfate.

The detailed mechanism is not clear; however, it is presumed that when the aforementioned method is employed, the monomers and the polymerization initiator penetrate into the styrene resin particles, and the particular (meth)acrylic acid esters become polymerized inside the styrene resin particles. It is presumed that because of this mechanism, composite resin particles in which the particular (meth)acrylic acid ester resin is contained inside the styrene resin particles and in which the particular styrene resin and the particular (meth)acrylic acid ester resin are in a microphase-separated state inside the particles are obtained.

The volume-average particle diameter of the composite resin particles dispersed in the composite resin particle dispersion is preferably 140 nm or more and 300 nm or less, more preferably 150 nm or more and 280 nm or less, and yet more preferably 160 nm or more and 250 nm or less.

The amount of the composite resin particles in the composite resin particle dispersion is preferably 20 mass % or more and 50 mass % or less and is more preferably 30 mass % or more and 40 mass % or less relative to the entire mass of the composite resin particle dispersion.

Aggregated Particle Forming Step

In the aggregated particle forming step, the composite resin particles in the composite resin particle dispersion are aggregated to form aggregated particles.

In the aggregated particle forming step, the composite resin particles are aggregated to form aggregated particles having diameters close to the target diameter of the base particles.

Specifically, for example, in the aggregated particle forming step, an aggregating agent is added to the composite resin particle dispersion while the pH of the composite resin particle dispersion is adjusted to acidic (for example, a pH of 2 or more and 5 or less), and after a dispersion stabilizer is added as needed, the dispersion is heated to a temperature close to the glass transition temperature of the particular styrene resin (specifically, for example, a temperature 10° C. to 30° C. lower than the glass transition temperature of the particular styrene resin) so as to aggregate the composite resin particles and form aggregated particles.

In the aggregated particle forming step, while the composite resin particle dispersion is being stirred in a rotational shear-type homogenizer, an aggregating agent may be added thereto at room temperature (for example, 25° C.) and the pH of the composite resin particle dispersion may be adjusted to acidic (for example, a pH2 or more and 5 or less), and then heating may be performed after the dispersion stabilizer is added as needed.

Examples of the aggregating agent include a surfactant having an opposite polarity to the surfactant contained in the composite resin particle dispersion, an inorganic metal salt, and a divalent or higher valent metal complex. When a metal complex is used as the aggregating agent, the amount of the surfactant used is reduced, and the charge properties are improved.

An additive that forms a complex with a metal ion in the aggregating agent or that forms a similar bond therewith may be used in combination with the aggregating agent as needed. An example of such an additive is a chelating agent.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is preferably 0.01 parts by mass or more and 5.0 parts by mass or less and more preferably 0.1 parts by mass or more and less than 3.0 parts by mass relative to 100 parts by mass of the resin particles.

Fusing and Coalescing Step

In the fusing and coalescing step, the aggregated particle dispersion in which the aggregated particles are dispersed is heated so as to fuse and coalesce the aggregated particles and thereby form base particles.

In the fusing and coalescing step, the aggregated particle dispersion containing dispersed aggregated particles is heated to, for example, a temperature equal to or higher than the glass transition temperature of the particular styrene resin (for example, a temperature 10° C. to 30° C. higher than the glass transition temperature of the particular styrene resin) to fuse and coalesce the aggregated particles and form base particles.

The base particles obtained through the above-described steps usually have a sea-island structure that has a sea phase containing a particular styrene resin and island phases that are dispersed in the sea phase and contain a particular (meth)acrylic acid ester resin. It is presumed that although the particular styrene resin and the particular (meth)acrylic acid ester resin are in a microphase-separated state in the composite resin particles, the particular styrene resin is gathered in the fusing and coalescing step to form a sea phase, and the particular (meth)acrylic acid ester resin is gathered to form island phases.

The average size of the island phases of the sea-island structure is controlled by, for example, increasing or decreasing the amount of the styrene resin particle dispersion or the amount of the at least two (meth)acrylic acid esters used in the composite resin particle forming step, or by increasing or decreasing the length of time of maintaining a high temperature in the fusing and coalescing step.

The base particles having a core-shell structure are produced through the following steps, for example:

after an aggregated particle dispersion (hereinafter may be referred to as a first aggregated particle dispersion in which first aggregated particles are dispersed) is obtained in the aforementioned aggregated particle forming step, a step of mixing the aggregated particle dispersion and a styrene resin particle dispersion so that the styrene resin particles attach to the surfaces of the aggregated particles and form second aggregated particles (second aggregated particle forming step); and a step of heating the second aggregated particle dispersion in which the second aggregated particles are dispersed so as to fuse and coalesce the second aggregated particles and thereby form base particles having a core-shell structure (core-shell structure forming step).

The base particles having a core-shell structure obtained through the aforementioned steps have a shell layer containing a particular styrene resin.

Instead of the styrene resin particle dispersion, a resin particle dispersion in which a different type of resin particles are dispersed may be used to form a shell layer that contains the different type of resin.

After completion of the fusing and coalescing step, the base particles formed in liquid are subjected to a washing step, a solid-liquid separation step, and a drying step known in the art so as to obtain dry base particles.

From the viewpoint of chargeability, the washing step may involve thorough displacement washing with ion exchange water. From the viewpoint of productivity, the solid-liquid separation step may involve suction filtration, pressure filtration, or the like. From the viewpoint of productivity, the drying step may involve freeze-drying, flash-drying, fluid-drying, vibration-type fluid-drying, or the like.

The particular particles are formed by, for example, adding an external additive to the obtained dry base particles, and mixing the resulting mixture.

Mixing may be performed by using a V blender, a HENSCHEL mixer, a Lodige mixer, or the like.

If needed, a vibrating screen, an air screen, or the like may be used to remove coarse particles.

The particular particles may be directly applied for use or may be used as an electrostatic charge image developer. The electrostatic charge image developer may be a one-component developer that contains only the particular particles, or a two-component developer that is a mixture of the particular particles and a carrier.

The carrier is not particularly limited and may be any known carrier. Examples of the carrier include a coated carrier prepared by covering the surface of a magnetic powder core with a resin, a magnetic powder-dispersed carrier prepared by dispersing and blending magnetic powder in a matrix resin, and a resin-impregnated carrier prepared by impregnating porous magnetic powder with a resin. The magnetic powder-dispersed carrier and the resin-impregnated carrier may each be a carrier that has a core being composed of the particles constituting the carrier and having a resin-coated surface.

Examples of the magnetic powder include magnetic metals such as iron, nickel, and cobalt, and magnetic oxides such as ferrite and magnetite.

Examples of the resin for coating and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin containing an organosiloxane bond and modified products thereof, fluororesin, polyester, polycarbonate, phenolic resin, and epoxy resin. The resin for coating and the matrix resin may contain other additives, such as conductive particles. Examples of the conductive particles include particles of metals such as gold, silver, and copper, and particles of carbon black, titanium oxide, zinc oxide, tin oxide, barium sulfate, aluminum borate, and potassium titanate.

An example of the method for covering the surface of the core with the resin is a method that involves coating the surface of the core with a coating layer-forming solution prepared by dissolving the resin for coating and various additives (used as needed) in an appropriate solvent. The solvent is not particularly limited and may be selected by considering the type of the resin to be used, suitability of application, etc.

Specific examples of the resin coating method include a dipping method involving dipping cores in the coating-layer-forming solution, a spraying method involving spraying the coating-layer-forming solution onto core surfaces, a fluid bed method involving spraying a coating-layer-forming solution while having the cores float on a bed of air, and a kneader coater method involving mixing cores serving as carriers and a coating-layer-forming solution in a kneader coater and then removing the solvent.

In a two-component developer, the particular particles-to-carrier mixing ratio (mass ratio) is preferably 1:100 to 30:100 and is more preferably 3:100 to 20:100.

EXAMPLES

The exemplary embodiments of the present disclosure will now be described in detail through examples, but the present disclosure is not limited by these examples. In the description below, "parts" and "%" are on a mass basis unless otherwise noted.

Example A

Preparation of Particular Particles
Preparation of Styrene Resin Particle Dispersion (A1) and Composite Resin Particle Dispersion (A1)
  Styrene: 450 parts
  n-Butyl acrylate: 140 parts
  Acrylic acid: 20 parts
  Dodecanethiol: 10 parts The above-described components are mixed and dissolved to prepare a monomer solution.

In 250 parts of ion exchange water, 10 parts of an anionic surfactant (DOWFAX 2A1 produced by The Dow Chemical Company) is dissolved. The monomer solution is added to the resulting solution, and the mixture is dispersed in a flask and emulsified to obtain an emulsion.

In 555 parts ion exchange water, 1 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube, is heated on a water bath to 75° C. under slow stirring while injecting nitrogen, and is retained at that temperature.

In 43 parts of ion exchange water, 9 parts of ammonium persulfate is dissolved, and the resulting solution is added dropwise into a polymerization flask over a period of 20 minute via a metering pump. Then, the emulsion is added dropwise thereto over a period of 200 minutes via a metering pump.

Subsequently, while stirring is continued, the polymerization flask is retained at 75° C. for 3 hours and then the temperature is returned to room temperature (25° C.) to terminate the first stage polymerization.

As a result, a styrene resin particle dispersion (A1) that contains styrene resin particles, in which the volume-average particle diameter (D50v) of the resin particles is 195 nm, the glass transition temperature is 53° C., and the weight-average molecular weight as measured by GPC (UV detection) is 32,000, is obtained.

Next, to the polymerization flask holding the styrene resin particle dispersion (A1) having a temperature decreased to room temperature (25° C.), 240 parts of 2-ethylhexyl acrylate, 160 parts of n-butyl acrylate, and 1200 parts of ion exchange water are added, and the resulting mixture is stirred slowly for 2 hours.

Subsequently, while stirring is continued, the temperature is elevated to 70° C., and 4.5 parts of ammonium persulfate and 100 parts of ion exchange water are added dropwise thereto over a period of 20 minutes via a metering pump. Subsequently, while stirring is continued, the temperature is retained thereat for 3 hours to terminate polymerization.

Through the above-described steps, a composite resin particle dispersion (A1) having a volume-average particle diameter (D50v) of 240 nm, a weight-average molecular weight of 133,000 as determined by GPC (UV detection), a number-average molecular weight of 18,000, and a solid content of 30 mass % as adjusted by addition of ion exchange water is obtained.

The obtained composite resin particles in the composite resin particle dispersion (A1) are dried, and the dried composite resin particles are embedded in an epoxy resin to prepare a sample. The sample is cut with a diamond knife to prepare a section of the composite resin particles. The section of the sample is stained in a ruthenium tetroxide steam, and is then observed with a transmission electron microscope. The cross-sectional observation of the composite resin particles confirms that the composite resin particles have a structure in which multiple domains of a low-Tg (meth)acrylic acid ester resin are dispersed in a high-Tg styrene resin serving as a base material.

The glass transition temperature Tg behavior of the dried composite resin particles from −150° C. is analyzed with a differential scanning calorimeter (DSC) produced by Shimadzu Corporation. As a result, glass transition due to the low-Tg (meth)acrylic acid ester resin is observed at −60° C. In addition, glass transition due to the high-Tg styrene resin is observed at 53° C. (difference in glass transition temperature: 113° C.)

Preparation of Styrene Resin Particle Dispersion (B1)
Styrene: 450 parts
n-Butyl acrylate: 135 parts
Acrylic acid: 12 parts
Dodecanethiol: 9 parts The above-described components are mixed and dissolved to prepare a monomer solution.

Meanwhile, in 250 parts of ion exchange water, 10 parts of an anionic surfactant (DOWFAX 2A1 produced by The Dow Chemical Company) is dissolved. The monomer solution is added to the resulting solution, and the mixture is dispersed in a flask and emulsified to obtain an emulsion.

In 555 parts ion exchange water, 1 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube, is heated on a water bath to 75° C. under slow stirring while injecting nitrogen, and is retained at that temperature.

In 43 parts of ion exchange water, 9 parts of ammonium persulfate is dissolved, and the resulting solution is added dropwise into a polymerization flask over a period of 20 minutes via a metering pump. Then, the emulsion is added dropwise thereto over a period of 200 minutes via a metering pump.

Subsequently, while stirring is continued, the polymerization flask is retained at 75° C. for 3 hours and then the temperature is returned to room temperature (25° C.) to terminate the first stage polymerization.

As a result, a styrene resin particle dispersion (B1) that contains styrene resin particles, in which the volume-average particle diameter (D50v) of the resin particles is 190 nm, the glass transition temperature is 53° C., the weight-average molecular weight is 33,000, the number-average molecular weight as measured by GPC (UV detection) is 15,000, and the solid content adjusted by addition of ion exchange water is 40 mass %, is obtained.

Preparation of Releasing Agent Dispersion (A1)
Fischer-Tropsch wax: 270 parts
(trade name: FNP-0090 produced by Nippon Seiro Co., Ltd., melting temperature=90° C.)
Anionic surfactant: 1.0 part
(NEOGEN RK produced by DKS Co., Ltd.)
Ion exchange water: 400 parts The above-described components are mixed, heated to 95° C., and dispersed in a homogenizer (ULTRA-TURRAX T50 produced by IKA Japan). The resulting dispersion is then dispersed in a Manton-Gaulin high-pressure homogenizer (produced by Gaulin Company) for 360 minutes to prepare a releasing agent dispersion (A1) (solid component concentration: 20 mass %) containing dispersed releasing agent having a volume-average particle diameter of 0.23 µm.

Preparation of Particular Particles (A1) and Developer (A1)
Composite resin particle dispersion (A1): 600 parts
Releasing agent dispersion (A1): 8 parts
Aqueous colloidal silica solution: 13 parts
(SNOWTEX OS Produced by Nissan Chemical Corporation)
Ion exchange water: 1000 parts
Anionic surfactant: 1 part
(DOWFAX 2A1 Produced by the Dow Chemical Company)

The above-described components are placed in a 3 L reactor equipped with a thermometer, a pH meter, and a stirrer, and the pH is adjusted to 3.0 by adding a 1.0 mass % aqueous nitric acid solution at a temperature of 25° C. Then, while the resulting mixture is dispersed in a homogenizer (ULTRA-TURRAX T50 produced by IKA Japan) at 5,000 rpm, 4 parts of a 10 mass % aqueous polyaluminum chloride solution is added, and dispersing is conducted for 6 minutes.

Subsequently, a heating mantle is attached to the reactor. While the rotation rate of the stirrer is adjusted so that the slurry is thoroughly stirred, the temperature is elevated at a temperature elevation rate of 0.2° C./minute up to a temperature of 40° C. and then at 0.05° C./minute beyond 40° C. The particle diameter is measured every 10 minutes with MULTISIZER II (aperture diameter: 50 µm, produced by Coulter Inc.). The temperature is retained when the volume-average particle diameter reached 7.5 µm, and 115 parts of the styrene resin particle dispersion (B1) is added thereto over a period of 5 minutes. This condition is retained for 30 minutes after the addition, and the pH of the slurry is adjusted to 6.0 by using a 1.0 mass % aqueous sodium hydroxide solution. Subsequently, while the pH is adjusted to 6.0 every 5° C., the temperature is elevated at a temperature elevation rate of 1° C./minute up to 96° C., and the temperature is retained at 96° C. The particle shape and the surface property are observed with an optical microscope and a field emission-type scanning electron microscope (FE-SEM), and coalescence of particles is confirmed at the 2.0th hour. The reactor is then cooled to 30° C. by using cooling water over a period of 5 minutes.

The cooled slurry is passed through a nylon mesh having an aperture of 30 µm to remove coarse particles, and the slurry that has passed through the mesh is filtered at a reduced pressure by using an aspirator. The solid matter remaining on the paper filter is manually pulverized as finely as possible and is added to ion exchange water at a temperature of 30° C. in an amount ten times the amount of the solid matter. The resulting mixture is stirred and mixed for 30 minutes. Subsequently the solid matter remaining on the paper filter after filtration at a reduced pressure in an aspirator is pulverized manually as finely as possible and is added to ion exchange water in an amount ten times the amount of the solid matter at a temperature 30° C. The resulting mixture is stirred and mixed for 30 minutes and is again filtered at a reduced pressure with an aspirator. The electrical conductivity of the filtrate is measured. This operation is repeated until the electrical conductivity of the filtrate is 10 µS/cm or less so as to wash the solid matter.

The washed solid matter is finely pulverized in a wet-dry-type particle sizer (Comil) and then vacuum-dried in a dryer at 25° C. for 36 hours. As a result, base particles (A1) are obtained. The obtained base particles (A1) have a volume-average particle diameter of 8.1 µm, a weight-average molecular weight of 126,000, and a number-average molecular weight of 17,000.

Next, To 100 parts of the obtained base particles (A1), 1.5 parts of hydrophobic silica (RY50 produced by Nippon Aerosil Co., Ltd.) is added, and the resulting mixture is mixed in a sample mill at 13000 rpm for 30 seconds. The mixture is then screened through a vibrating screen having an aperture of 45 μm to obtain particular particles (A1). The volume-average particle diameter of the obtained particular particles (A1) is 8.4 μm.

Using the particular particles (A1) as a sample, the thermal behavior in the temperature range of −150° C. to 100° C. is analyzed with a differential scanning calorimeter (DSC-60A produced by Shimadzu Corporation), and glass transition temperatures are observed at −60° C. and 53° C.

The temperature T1 and the temperature T2 of the particular particles (A1) are measured with the aforementioned measuring method. The particular particles (A1) satisfy formula 1, "10° C.≤T1−T2".

A section of the particular particles (A1) is observed with a scanning electron microscope (SEM). A sea-island structure is observed. The particular particles (A1) have a core in which island phases are present, and a shell layer in which no island phases are present. The sea phase contains a styrene resin, and the island phases contain a (meth)acrylic acid ester resin. The average size of the island phases determined by the aforementioned measuring method is 250 nm.

For the particular particles (A1), the temperature difference (T1−T3), which is the indicator of how easily the particles undergo pressure-induced phase transition, is determined. Specifically, the temperature T1 and the temperature T3 are measured with a Flowtester (CFT-500 produced by Shimadzu Corporation). The temperature T3 is 76° C., and the temperature difference (T1−T3) is 17° C.

A color image having a black image area ratio of 8%, is formed in a peripheral edge portion (in other words, the region having a distance of 0 mm or more and 5 mm or less from the periphery of the recording medium) of one surface of a recording medium (OK Prince high-grade paper produced by Oji Paper Co., Ltd.) by using an ink jet recording apparatus. Next, the particular particles (1) are sprayed onto the entire image-forming surface so that the amount of the particular particles (1) provided is 3 g/m², and the recording medium is passed through a belt roll heating-type fixing machine, which is a fixing device, so as to heat and fix the particular particles (1) onto the image forming surface of the recording medium at 150° C. to form a layer of the particular particles. The recording medium having the layer of the particular particles on the image forming surface is folded in two with the image forming surface arranged on the inner side by using a sealer, PRESSLE multi II produced by Toppan Forms Co., Ltd., and a pressure is applied to the folded recording medium so as to bond the flaps of the image-forming surface to each other at a pressure of 90 MPa.

The recording medium which is folded in two with the image forming surface arranged on the inner side and in which the flaps of the image forming surface are bonded to each other does not undergo initial peeling and exhibits an excellent property in terms of the peel after time lapse under a high temperature and high humidity.

Into a V-type blender, 8 parts of the particular particles (A1) and 100 parts of the following resin-coated carrier are placed, and the resulting mixture is stirred for 20 minutes. Then the mixture is screened through a vibrating screen having an aperture of 212 μm to obtain a developer (A1).

A coating layer-forming solution containing dispersed zinc oxide is prepared by mixing 14 parts of toluene, 2 parts of a styrene-methyl methacrylate copolymer (mass ratio =80/20, weight-average molecular weight: 70000), and 0.6 parts of MZ500 (zinc oxide produced by Titan Kogyo, Ltd.) and stirring the resulting mixture in a stirrer for 10 minutes. Next, the coating layer-forming solution and 100 parts of ferrite particles (volume-average particle diameter: 38 μm) are placed in a vacuum deaerator-type kneader, and stirred at 60° C. for 30 minutes. Then, the pressure is reduced to deaerate while the mixture is heated and dried. As a result, a resin-coated carrier is obtained.

Preparation of Color Image-Forming Toner and Color Image-Forming Developer

Crystalline Polyester Resin Dispersion (A2)

To a heated and dried three-necked flask, 100 parts of a monomer component composed of 100 mol % of dimethyl sebacate and 100 mol % of nonanediol and 0.3 parts of dibutyl tin oxide serving as a catalyst are placed, and then air inside the flask is replaced with nitrogen gas to create an inert atmosphere by a depressurizing operation. The resulting mixture is mechanically stirred at 180° C. for 4 hours and refluxed.

Subsequently, at a reduced pressure, the temperature is gradually elevated to 230° C., the mixture is stirred for 2 hours, and, after the mixture has turned viscous, the mixture is air-cooled to terminate the reaction. As a result, a crystalline polyester resin (A2) is synthesized. The weight-average molecular weight (Mw) of the obtained crystalline polyester resin (A2) as determined by molecular weight measurement (polystyrene equivalent) by gel permeation chromatography is 15300, the number-average molecular weight (Mn) is 3800, and the acid value is 13.5 mgKOH/g.

The melting point (Tm) of the crystalline polyester resin (A2) is measured with a differential scanning calorimeter (DSC). The crystalline polyester resin (A2) exhibits a clear endothermic peak, and the endothermic peak temperature is 77.2° C.

Next, a resin particle dispersion is prepared by using the crystalline polyester resin (A2).

Crystalline polyester resin (A2): 90 parts
Ionic surfactant (NEOGEN RK produced by DKS Co., Ltd.): 1.8 parts
Ion exchange water: 210 parts The above-described components are mixed and heated to 100° C. The resulting mixture is dispersed in a homogenizer (ULTRA-TURRAX T50 produced by IKA Japan), and the resulting dispersion is then dispersed in a pressure-discharge-type Gaulin homogenizer while being heated to 110° C. for 1 hour. As a result, a crystalline polyester resin dispersion (A2) having a volume-average particle diameter of 210 nm and a solid content of 30 mass % is obtained.

Amorphous Polyester Resin Dispersion (A2)
Bisphenol A propylene oxide adduct: 80 mol %
Bisphenol A ethylene oxide 2-mol adduct: 20 mol %
Terephthalic acid: 60 mol %
Fumaric acid: 20 mol %
Dodecenylsuccinic anhydride: 20 mol %

The monomer components having the ratios described above are charged into a 5 L flask equipped with a stirrer, a nitrogen inlet tube, a temperature sensor, and a distillation column, and the temperature is elevated to 190° C. over a period of 1 hour. After confirming that the reaction system is evenly and thoroughly stirred, 1.2 parts of dibutyl tin oxide is added relative to 100 parts of the monomer components. While distilling away generated water, the temperature is increased from the aforementioned temperature to 240° C. over a period of 6 hours, a dehydration condensation reaction is continued further for 2 hours at 240° C., and, as a result, an amorphous polyester resin (A2), which is an amorphous polyester resin having a glass transition temperature of 63° C., an acid value of 10.5 mgKOH/g, a weight-average molecular weight of 17000, and a number-average molecular weight of 4200, is obtained.

Next, a resin particle dispersion is prepared by using the obtained amorphous polyester resin (A2).

Amorphous polyester resin(A2): 100 parts
Ethyl acetate: 50 parts

Into a 5 L separable flask, ethyl acetate is placed, and then the above-described resin component is slowly added while the mixture is being stirred with a three-one motor to achieve complete dissolution and to thereby obtain an oil phase. To the oil phase that is being stirred, a total of 2 parts of a 10 mass % aqueous ammonia solution is added slowly using a dropper, and 230 parts of ion exchange water is further added thereto dropwise at a speed of 10 ml/min so as to induce inverse phase emulsification. Furthermore, the solvent is removed while reducing the pressure with an evaporator, and an amorphous polyester resin dispersion (A2) is obtained as a result. The amorphous polyester resin particles in this dispersion have a volume-average particle diameter of 120 nm, and the solid concentration is 30 mass %.

Coloring Agent Particle Dispersion (A1)

Carbon black (Regal 330 produced by Cabot Corporation): 50 parts
Anionic surfactant (NEWREX R produced by NOF CORPORATION): 2 parts
Ion exchange water: 198 parts The above-described components are mixed, pre-dispersed in a homogenizer (ULTRA-TURRAX T50 produced by IKA Japan) for 10 minutes, and then dispersed in ALTIMIZER (counter collision-type wet-type disintegrator produced by SUGINO MACHINE LIMITED) at a pressure of 245 MPa for 15 minutes. As a result, a coloring agent particle dispersion (A1) that contains coloring agent particles having a volume-average particle diameter of 354 nm and has a solid content of 20.0 mass % is obtained.

Coloring Agent Particle Dispersion (A2)

Blue pigment (copper phthalocyanine C.I. Pigment blue 15:3, produced by Dainichiseika Color & Chemicals Mfg. Co., Ltd.): 50 parts
Ionic surfactant (NEOGEN RK produced by DKS Co., Ltd.): 5 parts
Ion exchange water: 195 parts The above-described components are mixed, dispersed in a homogenizer (ULTRA-TURRAX T50 produced by IKA Japan) for 10 minutes, and then dispersed in ALTIMIZER (counter collision-type wet-type disintegrator produced by SUGINO MACHINE LIMITED) at a pressure of 245 MPa for 15 minutes. As a result, a coloring agent particle dispersion (A2) that contains coloring agent particles having a volume-average particle diameter of 462 nm and has a solid content of 20.0 mass % is obtained.

Coloring Agent Particle Dispersion (A3)

Magenta pigment (C.I. Pigment Red 122): 80 parts
Anionic surfactant (NEOGEN SC produced by DKS Co., Ltd.): 8 parts
Ion exchange water: 200 parts The above-described components are mixed and dissolved, the resulting mixture is dispersed in a homogenizer (ULTRA-TURRAX T50 produced by IKA Japan) for 10 minutes, and then the resulting dispersion is exposed to 28 kHz ultrasonic waves for 10 minutes by using an ultrasonic wave disperser. As a result, a coloring agent particle dispersion (A3) that contains coloring agent particles having a volume-average particle diameter of 132 nm and has a solid content of 29.0 mass % is obtained.

Coloring Agent Particle Dispersion (A4)

Yellow pigment (5GX 03 produced by Clariant): 80 parts
Anionic surfactant (NEOGEN SC produced by DKS Co., Ltd.): 8 parts
Ion exchange water: 200 parts The above-described components are mixed and dissolved, the resulting mixture is dispersed in a homogenizer (ULTRA-TURRAX T50 produced by IKA Japan) for 10 minutes, and then the resulting dispersion is exposed to 28 kHz ultrasonic waves for 20 minutes by using an ultrasonic wave disperser. As a result, a coloring agent particle dispersion (A4) that contains coloring agent particles having a volume-average particle diameter of 108 nm and has a solid content of 29.0 mass % is obtained.

Releasing Agent Particle Dispersion (A2)

Olefin wax (melting point: 88° C.): 90 parts
Ionic surfactant (NEOGEN RK produced by DKS Co., Ltd.): 1.8 parts
Ion exchange water: 210 parts The above-described materials are mixed and heated to 100° C. The resulting mixture is dispersed in a homogenizer (ULTRA-TURRAX T50 produced by IKA Japan), and the resulting dispersion is then heated in a pressure-discharge-type Gaulin homogenizer to 110° C. and dispersed for 1 hour. As a result, a releasing agent particle dispersion (A2) that contains releasing agent particles having a volume-average particle diameter of 180 nm and has a solid content of 30 mass % is obtained.

Preparation of Black Toner Particles (A1)

Amorphous polyester resin dispersion (A2): 166 parts
Crystalline polyester resin dispersion (A2): 50 parts
Coloring agent particle dispersion (A1): 25 parts
Releasing agent particle dispersion (A2): 40 parts The above-described materials are mixed and dispersed in a stainless steel round flask using a homogenizer (ULTRA-TURRAX T50). Next, 0.20 parts of polyaluminum chloride is added thereto, and the dispersing operation is continued by using ULTRA-TURRAX T50. The resulting mixture is heated to 48° C. while the flask is stirred on a heating oil bath. After 48° C. is retained for 60 minutes, 60 parts of the amorphous polyester resin dispersion (A) is gradually added thereto. Subsequently, the pH of the system is adjusted to 8.0 by using a 0.5 mol/l aqueous sodium hydroxide solution, the stainless steel flask is sealed, and heating performed to 90° C. while continuing stirring by using a magnetic seal. Then this temperature is retained for 3 hours.

Upon completion of the reaction, the mixture is cooled, filtered, and washed with ion exchange water. Then solid-liquid separation is performed by Nutsche suction filtration. The resulting product is re-dispersed in 1 L of ion exchange water at 40° C., and stirred and washed at 300 rpm for 15 minutes. This operation is repeated five more times. After the pH of the filtrate has reached 7.5 and the electrical conductivity has reached 7.0 μS/cm, solid-liquid separation is performed by Nutsche suction filtration using a No. 5A paper filter. Subsequently, vacuum drying is continued for 12 hours, and black toner particles (A1) are obtained as a result.

The particle diameter of the black toner particles (A1) is measured with MULTISIZER II. The volume-average particle diameter D50 is 6.4 μm, and the volume particle diameter distribution index GSDv is 1.21.

Preparation of Black Toner (A1)

One hundred parts of the black toner particles (A1), 0.8 parts of decylsilane-treated hydrophobic titania having an average particle diameter of 15 nm, and 1.3 parts of hydrophobic silica (NY50 produced by Nippon Aerosil Co., Ltd.) having an average particle diameter of 30 nm are mixed, and the mixture is mixed for 10 minutes in a Henschel mixer at a peripheral speed of 32 m/s. Subsequently, coarse particles are removed by using a 45 μm sieve to obtain a black toner (A1).

Preparation of Developer (C1)

Ferrite particles (volume-average particle diameter: 50 μm, volume resistivity: $10^8$ Ωcm): 100 parts Toluene: 14 parts Perfluorooctyl ethyl acrylate/methyl methacrylate copolymer (copolymerization ratio: 40/60, Mw: 50,000): 1.6 parts Carbon black (VXC-72 produced by Cabot Corporation): 0.12 parts Crosslinked melamine resin particles (number-average particle diameter: 0.3 μm): 0.3 parts Of the components described above, the components other than the ferrite particles are mixed and dispersed by a stirrer for 10 minutes to prepare a coating film-forming solution. This coating film-forming solution and the ferrite particles are placed in a vacuum deaerator-type kneader and stirred for 30 minutes at 60° C. Then, the pressure is decreased, toluene is distilled away, and resin coating films are formed on the ferrite particle surfaces. As a result, a carrier (A2) is produced.

Ninety-four parts of the carrier (A2) and 6 parts of the black toner (A1) are mixed and stirred for 20 minutes in a V-blender at 40 rpm, and sieved through a 177 μm sieve to prepare a developer (C1).

Preparation of Cyan Toner Particles (A2), Cyan Toner (A2), and Developer (C2)

Cyan toner particles (A2) are obtained as with the preparation of the black toner particles (A1) except that the coloring agent particle dispersion (A1) used in preparing the black toner particles (A1) is changed to 20 parts of the coloring agent particle dispersion (A2). The volume-average particle diameter D50 of the obtained toner particles is 7.2 μm, and the volume particle size distribution index is 1.19.

A cyan toner (A2) is obtained as with the black toner (A1) except that the cyan toner particles (A2) are used instead of the black toner particles (A1).

A developer (C2) is obtained as with the developer (C1) except that the cyan toner (A2) is used instead of the black toner (A1).

Preparation of Magenta Toner Particles (A3), Magenta Toner (A3), and Developer (C3)

Magenta toner particles (A3) are obtained as with the preparation of the black toner particles (A1) except that the coloring agent particle dispersion (A1) used in preparing the black toner particles (A1) is changed to 25 parts of the coloring agent particle dispersion (A3). The volume-average particle diameter D50 of the obtained toner particles is 6.8 μm, and the volume particle size distribution index is 1.22.

A magenta toner (A3) is obtained as with the black toner (A1) except that the magenta toner particles (A3) are used instead of the black toner particles (A1).

A developer (C3) is obtained as with the developer (C1) except that the magenta toner (A3) is used instead of the black toner (A1).

Preparation of Yellow Toner Particles (A4), Yellow Toner (A4), and Developer (C4)

Yellow toner particles (A4) are obtained as with the preparation of the black toner particles (A1) except that the coloring agent particle dispersion (A1) used in preparing the black toner particles (A1) is changed to 25 parts of the coloring agent particle dispersion (A4). The volume-average particle diameter D50 of the obtained toner particles is 7.4 μm, and the volume particle size distribution index is 1.19.

A yellow toner (A4) is obtained as with the black toner (A1) except that the yellow toner particles (A4) are used instead of the black toner particles (A1).

A developer (C4) is obtained as with the developer (C1) except that the yellow toner (A4) is used instead of the black toner (A1).

Preparation of Pressure-Bonded Printed Material

Preparation of Pressure-Bonded Printed Material (A1)

The developer (A1) containing particular particles is supplied to a developing device of a modified model of Color 1000 Press produced by Fuji Xerox Co., Ltd., loaded with black, cyan, magenta, and yellow color image-forming developers (C1) to (C4).

Recording sheets (OK Prince high-grade paper produced by Oji Paper Co., Ltd.) are set as recording media, and a character-photographic image mixed image (the image area ratio relative to the entire recording surface of the recording medium: 50%) is formed as the color image.

Furthermore, a solid image of the particular particles (A1) (in other words, a particular particle region) having a loading amount of 3 g/m² is formed on the entire recording surface of the recording medium, and fixed at a fixing temperature of 170° C. and a fixing pressure of 4.0 kg/cm². The order in which the images are placed from the side close to the recording paper is the color images and the particular particle region.

Next, the recording medium is folded so that the surfaces of the flaps with the image fixed thereon come into contact with each other, and is press-bonded by using a modified model of a pressure-bonding sealer PRESSELE LEADA (produced by Toppan Forms Co., Ltd.) to prepare a press-bonded printed material (A1).

For the obtained pressure-bonded printed material (A1), the image area ratio of the color image in the peripheral edge portion of the recording medium (that is, the region having a distance of 0 mm or more and 5 mm or less from the periphery of the recording medium) and the image area ratio of the color image in the quasi peripheral edge portion of the recording medium (that is, the region having a distance of more than 5 mm but not more than 10 mm from the periphery of the recording medium) are indicated in Table 1.

Pressure-Bonded Printed Materials (A2) to (A5)

Pressure-bonded printed materials (A2) to (A5) are obtained as with the pressure-bonded printed material (A1) except that the mixed image is formed such that the image area ratio of the color image in the peripheral edge portion of the recording medium and the image area ratio of the color image in the quasi peripheral edge portion of the recording medium are the values indicated in Table 1.

Pressure-Bonded Printed Material (A6)

A pressure-bonded printed material (A6) is obtained as with the pressure-bonded printed material (A1) except that a dotted pattern image (yellow image) is formed as a color image in the peripheral edge portion of the recording medium in addition to the mixed image. This dotted pattern image had 100 dot images in a 5 mm×5 mm range. For the pressure-bonded printed material (A6), the image area ratio of the color image in the peripheral edge portion of the recording medium and the image area ratio of the color image in the quasi peripheral edge portion of the recording medium are indicated in Table 1.

Pressure-Bonded Printed Material (A7)

A pressure-bonded printed material (A7) is obtained as with the pressure-bonded printed material (A1) except that a dotted pattern image (yellow image) is formed as a color image on the entire recording surface of the recording medium in addition to the mixed image. This dotted pattern image had 150 dot images in a 5 mm×5 mm range. For the pressure-bonded printed material (A7), the image area ratio of the color image in the peripheral edge portion of the recording medium and the image area ratio of the color image in the quasi peripheral edge portion of the recording medium are indicated in Table 1.

Pressure-Bonded Printed Material (A8)

A pressure-bonded printed material (A8) is obtained as with the pressure-bonded printed material (A5) except that a dotted pattern image (yellow image) is formed as a color image in the peripheral edge portion of the recording medium in addition to the mixed image. This dotted pattern image had 20 dot images in a 5 mm×5 mm range. For the pressure-bonded printed material (A8), the image area ratio of the color image in the peripheral edge portion of the recording medium and the image area ratio of the color image in the quasi peripheral edge portion of the recording medium are indicated in Table 1.

Evaluation
Evaluation of Initial Peeling

A sample (peripheral edge portion) obtained by cutting the recording medium along sides (the periphery of the recording medium) with a width of 5 mm by using a pair of scissors is subjected to bonding evaluation. The evaluation standard is indicated below, and the results are indicated in Table 1 ("Initial peeling" in Table 1).

Evaluation Standard
A: Bonding is achieved without any gap.
B: There are gaps in some portions.
C: Peeling occurs simultaneously with cutting.

Evaluation of Peeling after Time Lapse Under High Temperature and High Humidity

The obtained pressure-bonded printed material is left to stand still in a high-temperature, high-humidity environment (specifically, an environment at a temperature of 28° C. and a humidity of 85%) for 14 days, and then subjected to a peeling test. In the peeling test, whether or not the pressure-bonded surface of the pressure-bonded printed material breaks due to peeling, and the peel force (N) applied at the time of peeling to the sample that does not undergo breaking are confirmed. The peel force is measured by using a tensile tester (model number: SEM STROGRAPH V1-C produced by Toyo Seiki Seisaku-sho, Ltd.) as a measurement instrument by a 90 degree peel method. A rectangular test piece having a width of 15 mm cut parallel to a long side of the pressure-bonded printed material from one end portion of the long side and perpendicular to the end portion of the long side is used as the measurement sample. The results are indicated in Table 1 ("Peeling after time lapse" in Table 1).

In Table 1, "-" indicates that the peeling after time lapse is not evaluated due to occurrence of initial peeling.

TABLE 1

| Pressure-bonded printed material | Image area ratio in peripheral edge portion (%) | Image area ratio in quasi-peripheral edge portion (%) | Initial peeling | Peeling after time lapse (N) |
|---|---|---|---|---|
| Example A1 | A1 | 0 | 10 | A | Peeling occurs |
| Example A2 | A2 | 3 | 15 | A | 1.5 |
| Example A3 | A3 | 7 | 7 | A | 1.2 |
| Example A4 | A4 | 18 | 5 | B | 0.9 |
| Example A5 | A5 | 25 | 20 | C | — |
| Example A6 | A6 | 5 | 10 | A | 1.4 |
| Example A7 | A7 | 10 | 5 | A | 1.0 |

TABLE 1-continued

| Pressure-bonded printed material | Image area ratio in peripheral edge portion (%) | Image area ratio in quasi-peripheral edge portion (%) | Initial peeling | Peeling after time lapse (N) |
|---|---|---|---|---|
| Comparative Example A8 | A8 | 30 | 30 | C | — |

As apparent from Table 1, in Examples, the initial peeling in the peripheral edge portion of the pressure-bonded printed material is suppressed compared to Comparative Examples.

Example B

Preparation of Dispersion Containing Styrene Resin Particles Preparation of Styrene Resin Particle Dispersion (St1)

Styrene: 390 parts
n-Butyl acrylate: 100 parts
Acrylic acid: 10 parts
Dodecanethiol: 7.5 parts The above-described materials are mixed and dissolved to prepare a monomer solution.

In 205 parts of ion exchange water, 8 parts of an anionic surfactant (DOWFAX 2A1 produced by The Dow Chemical Company) is dissolved, and is dispersed and emulsified by adding the aforementioned monomer solution to obtain an emulsion.

In 462 parts of ion exchange water, 2.2 part of an anionic surfactant (DOWFAX 2A1 produced by The Dow Chemical Company) is dissolved. The resulting solution is charged into a polymerization flask equipped with a stirrer, a thermometer, a reflux cooling tube, and a nitrogen inlet tube and is heated to 73° C. under stirring, and the temperature is retained thereat.

In 21 parts of ion exchange water, 3 parts of ammonium persulfate is dissolved, and the resulting solution is added dropwise to the aforementioned polymerization flask over a period of 15 minutes via a metering pump. Then, the aforementioned emulsion is added dropwise thereto over a period of 160 minutes via a metering pump.

Subsequently, while slow stirring is continued, the polymerization flask is retained at 75° C. for 3 hours, and then the temperature is returned to room temperature (25° C.)

As a result, a styrene resin particle dispersion (St1) that contains styrene resin particles having a volume-average particle diameter (D50v) of 174 nm, a weight-average molecular weight of 49000 as determined by GPC (UV detection), and a glass transition temperature of 54° C., and that has a solid content 42 mass % is obtained.

The styrene resin particle dispersion (St1) is dried to obtain styrene resin particles, and the thermal behavior in the temperature range of −100° C. to 100° C. is analyzed with a differential scanning calorimeter (DSC-60A produced by Shimadzu Corporation). One glass transition temperature is observed. Table 2 indicates the glass transition temperatures.

Preparation of Styrene Resin Particle Dispersions (St2) to (St13)

Styrene resin particle dispersions (St2) to (St13) are prepared as with the preparation of the styrene resin particle dispersion (St1) except that the monomers are changed as indicated in Table 2.

In Table 2, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA The composite resin particle dispersion (M1) is dried to obtain composite resin particles, and the thermal behavior in the temperature range of −150° C. to 100° C. is analyzed with a differential scanning calorimeter (DSC-60A produced by Shimadzu Corporation). Two glass transition temperatures are observed. Table 3 indicates the glass transition temperatures.

TABLE 2

Styrene resin particle dispersion

| No. | St | BA | 2EHA | EA | 4HBA | AA | MAA | CEA | D50v of resin particles nm | Mw | Tg ° C. |
|---|---|---|---|---|---|---|---|---|---|---|---|
| St1 | 78 | 20 | 0 | 0 | 0 | 2 | 0 | 0 | 174 | 49000 | 54 |
| St2 | 88 | 10 | 0 | 0 | 0 | 2 | 0 | 0 | 170 | 50000 | 76 |
| St3 | 83 | 15 | 0 | 0 | 0 | 2 | 0 | 0 | 172 | 52000 | 65 |
| St4 | 78 | 20 | 0 | 0 | 0 | 0 | 2 | 0 | 177 | 48000 | 57 |
| St5 | 80 | 15 | 0 | 0 | 5 | 0 | 0 | 0 | 172 | 46000 | 55 |
| St6 | 80 | 15 | 5 | 0 | 0 | 0 | 0 | 0 | 174 | 51000 | 54 |
| St7 | 80 | 20 | 0 | 0 | 0 | 0 | 0 | 0 | 169 | 50000 | 54 |
| St8 | 77 | 20 | 0 | 0 | 0 | 0 | 0 | 3 | 168 | 48000 | 54 |
| St9 | 72 | 26 | 0 | 0 | 0 | 2 | 0 | 0 | 172 | 55000 | 43 |
| St10 | 68 | 30 | 0 | 0 | 0 | 2 | 0 | 0 | 173 | 53000 | 35 |
| St11 | 80 | 0 | 20 | 0 | 0 | 0 | 0 | 0 | 171 | 52000 | 56 |
| St12 | 78 | 0 | 20 | 0 | 0 | 2 | 0 | 0 | 167 | 49000 | 56 |
| St13 | 63 | 0 | 0 | 35 | 0 | 2 | 0 | 0 | 169 | 51000 | 54 |

Preparation of Dispersion Containing Composite Resin Particles

Preparation of Composite Resin Particle Dispersion (M1)
- Styrene resin particle dispersion (St1): 1190 parts (solid content: 500 parts)
- 2-Ethylhexyl acrylate: 250 parts
- n-Butyl acrylate: 250 parts
- Ion exchange water: 982 parts The above-described materials are charged into a polymerization flask, stirred at 25° C. for 1 hour, and heated to 70° C.

In 75 parts of ion exchange water, 2.5 parts of ammonium persulfate is dissolved, and the resulting solution is added dropwise to the aforementioned polymerization flask over a period of 60 minutes via a metering pump.

Subsequently, while slow stirring is continued, the polymerization flask is retained at 70° C. for 3 hours, and then the temperature is returned to room temperature (25° C.)

As a result, a composite resin particle dispersion (M1) that contains composite resin particles having a volume-average particle diameter (D50v) of 219 nm and a weight-average molecular weight of 219000 as determined by GPC (UV detection) and that has a solid content 32 mass % is obtained.

Preparation of Composite Resin Particle Dispersions (M2) to (M21) and (cM1) to (cM3)

Composite resin particle dispersions (M2) to (M21) and (cM1) to (cM3) are prepared as with the preparation of the composite resin particle dispersion (M1) except that the styrene resin particle dispersion (St1) is changed as described in Table 3 or that the polymerization components of the (meth)acrylic acid ester resin are changed as described in Table 3.

Preparation of Composite Resin Particle Dispersions (M22) to (M27)

Composite resin particle dispersions (M22) to (M27) are prepared as with the preparation of the composite resin particle dispersion (M1) except that the amounts of 2-ethylhexyl acrylate and n-butyl acrylate used are adjusted.

In Table 3, the monomers are abbreviated as follows.

Styrene: St, n-butyl acrylate: BA, 2-ethylhexyl acrylate: 2EHA, ethyl acrylate: EA, 4-hydroxybutyl acrylate: 4HBA, acrylic acid: AA, methacrylic acid: MAA, 2-carboxyethyl acrylate: CEA, hexyl acrylate: HA, propyl acrylate: PA

TABLE 3

Composite resin particle dispersion

| | | St resin | | | | | Composite resin particles (or comparative resin particles) | | | |
|---|---|---|---|---|---|---|---|---|---|---|
| No. | St resin particle dispersion | Polymerization component | Tg ° C. | Ac resin Polymerization component | St resin/Ac resin mass ratio (St:Ac) | D50v of resin particles nm | Mw | Tg ° C. | Tg ° C. |
| cM1 | St1 | St/BA/AA = 78/20/2 | 54 | 2EHA = 100 | 50:50 | 222 | 230000 | −50 | 54 |
| cM2 | St1 | St/BA/AA = 78/20/2 | 54 | BA = 100 | 50:50 | 225 | 220000 | −53 | 54 |

TABLE 3-continued

Composite resin particle dispersion

| | St resin | | | Composite resin particles (or comparative resin particles) | | | | | |
|---|---|---|---|---|---|---|---|---|---|
| No. | St resin particle dispersion | Polymerization component | Tg °C. | Ac resin Polymerization component | St resin/Ac resin mass ratio (St:Ac) | D50v of resin particles nm | Mw | Tg °C. | °C. |
| cM3 | St12 | St/2EHA/AA = 78/20/2 | 56 | BA = 100 | 50:50 | 224 | 212000 | −53 | 56 |
| M1 | St1 | St/BA/AA = 78/20/2 | 54 | 2EHA/BA = 50/50 | 50:50 | 219 | 219000 | −52 | 54 |
| M2 | St2 | St/BA/AA = 88/10/2 | 76 | 2EHA/BA = 50/50 | 50:50 | 218 | 240000 | −52 | 76 |
| M3 | St3 | St/BA/AA = 83/15/2 | 65 | 2EHA/BA = 50/50 | 50:50 | 220 | 231000 | −52 | 65 |
| M4 | St4 | St/BA/MAA = 78/20/2 | 57 | 2EHA/BA = 50/50 | 50:50 | 221 | 250000 | −52 | 57 |
| M5 | St5 | St/BA/4HBA = 80/15/5 | 55 | 2EHA/BA = 50/50 | 50:50 | 224 | 242000 | −52 | 55 |
| M6 | St6 | St/BA/2EHA = 80/15/5 | 54 | 2EHA/BA = 50/50 | 50:50 | 225 | 233000 | −52 | 54 |
| M7 | St7 | St/BA = 80/20 | 54 | 2EHA/BA = 50/50 | 50:50 | 224 | 243000 | −52 | 54 |
| M8 | St8 | St/BA/CEA = 77/20/3 | 54 | 2EHA/BA = 50/50 | 50:50 | 222 | 260000 | −52 | 54 |
| M9 | St9 | St/BA/AA = 72/26/2 | 43 | 2EHA/BA = 50/50 | 50:50 | 223 | 251000 | −52 | 43 |
| M10 | St10 | St/BA/AA = 68/30/2 | 35 | 2EHA/BA = 50/50 | 50:50 | 220 | 243000 | −52 | 35 |
| M11 | St11 | St/2EHA = 80/20 | 56 | 2EHA/BA = 50/50 | 50:50 | 221 | 249000 | −52 | 56 |
| M12 | St12 | St/2EHA/AA = 78/20/2 | 56 | 2EHA/BA = 50/50 | 50:50 | 227 | 237000 | −52 | 56 |
| M13 | St12 | St/2EHA/AA = 78/20/2 | 56 | 2EHA/HA = 50/50 | 50:50 | 224 | 226000 | −55 | 56 |
| M14 | St13 | St/EA/AA = 63/35/2 | 54 | 2EHA/PA = 50/50 | 50:50 | 224 | 243000 | −45 | 54 |
| M15 | St1 | St/BA/AA = 78/20/2 | 54 | 2EHA/HA = 50/50 | 50:50 | 226 | 270000 | −54 | 54 |
| M16 | St1 | St/BA/AA = 78/20/2 | 54 | 2EHA/BA = 90/10 | 50:50 | 224 | 264000 | −51 | 54 |
| M17 | St1 | St/BA/AA = 78/20/2 | 54 | 2EHA/BA = 80/20 | 50:50 | 226 | 248000 | −52 | 54 |
| M18 | St1 | St/BA/AA = 78/20/2 | 54 | 2EHA/BA = 70/30 | 50:50 | 226 | 260000 | −52 | 54 |
| M19 | St1 | St/BA/AA = 78/20/2 | 54 | 2EHA/BA = 30/70 | 50:50 | 225 | 273000 | −52 | 54 |
| M20 | St1 | St/BA/AA = 78/20/2 | 54 | 2EHA/BA = 20/80 | 50:50 | 224 | 233000 | −52 | 54 |
| M21 | St1 | St/BA/AA = 78/20/2 | 54 | 2EHA/BA = 10/90 | 50:50 | 223 | 243000 | −53 | 54 |
| M22 | St1 | St/BA/AA = 78/20/2 | 54 | 2EHA/BA = 50/50 | 90:10 | 182 | 180000 | −52 | 54 |
| M23 | St1 | St/BA/AA = 78/20/2 | 54 | 2EHA/BA = 50/50 | 80:20 | 190 | 210000 | −52 | 54 |
| M24 | St1 | St/BA/AA = 78/20/2 | 54 | 2EHA/BA = 50/50 | 70:30 | 199 | 223000 | −52 | 54 |
| M25 | St1 | St/BA/AA = 78/20/2 | 54 | 2EHA/BA = 50/50 | 30:70 | 259 | 300000 | −52 | 54 |
| M26 | St1 | St/BA/AA = 78/20/2 | 54 | 2EHA/BA = 50/50 | 20:80 | 300 | 320000 | −52 | 54 |
| M27 | St1 | St/BA/AA = 78/20/2 | 54 | 2EHA/BA = 50/50 | 10:90 | 380 | 331000 | −52 | 54 |

Preparation of Particular Particles
Preparation of Particular Particles (1) and Developer (1)
Composite resin particle dispersion (M1): 504 parts
Ion exchange water: 710 parts
Anionic surfactant (DOWFAX 2A1 produced by The Dow Chemical Company): 1 part The above-described materials are placed in a reactor equipped with a thermometer and a pH meter, and the pH is adjusted to 3.0 by adding a 1.0 mass % aqueous nitric acid solution at a temperature of 25° C. Then, while the resulting mixture is dispersed in a homogenizer (ULTRA-TURRAX T50 produced by IKA Japan) at a rotation rate of 5000 rpm, 23 parts of a 2.0 mass % aqueous aluminum sulfate solution is added. Subsequently, a stirrer and a heating mantle are attached to the reactor. The temperature is elevated at a temperature elevation rate of 0.2° C./minute up to a temperature of 40° C. and then at 0.05° C. beyond 40° C. The particle diameter is measured every 10 minutes with MULTISIZER II (aperture diameter: 50 μm, produced by Beckman Coulter Inc.). The temperature is retained when the volume-average particle diameter reached 5.0 μm, and 170 parts of the styrene resin particle dispersion (St1) is added thereto over a period of 5 minutes. After completion of addition, a temperature of 50° C. is retained for 30 minutes, a 1.0 mass % aqueous sodium hydroxide solution is added thereto, and the pH of the slurry is adjusted to 6.0. Subsequently, while the pH is adjusted to 6.0 every 5° C., the temperature is elevated at a temperature elevation rate of 1° C./minute up to 90° C., and the temperature is retained at 90° C. The particle shape and the surface property are observed with an optical microscope and a field emission-type scanning electron microscope (FE-SEM), and coalescence of particles is confirmed at the 10th hour. The reactor is then cooled with cooling water over a period of 5 minutes to 30° C.

The cooled slurry is passed through a nylon mesh having an aperture of 15 μm to remove coarse particles, and the slurry that has passed through the mesh is filtered at a reduced pressure by using an aspirator. The solid matter remaining on the paper filter is manually pulverized as finely as possible and is added to ion exchange water (temperature: 30° C.) in an amount ten times the amount of the solid matter. The resulting mixture is stirred for 30 minutes. Subsequently, the solid matter remaining on the paper filter after filtration at a reduced pressure in an aspirator is pulverized manually as finely as possible and is added to ion exchange water (temperature: 30° C.) in an amount ten times the amount of the solid matter. The resulting mixture is stirred for 30 minutes and is again filtered at a reduced pressure with an aspirator. The electrical conductivity of the filtrate is measured. This operation is repeated until the electrical conductivity of the filtrate is 10 μS/cm or less so as to wash the solid matter.

The washed solid matter is finely pulverized in a wet-dry-type particle sizer (Comil) and then vacuum-dried in an oven at 25° C. for 36 hours. As a result, base particles (1) are obtained. The volume-average particle diameter of the base particles (1) is 8.0 μm.

One hundred parts of the base particles (1) and 1.5 parts of hydrophobic silica (RY50 produced by Nippon Aerosil Co., Ltd.) are mixed in a sample mill at a rotation rate of 13000 rpm for 30 seconds. The mixture is then screened through a vibrating screen having an aperture of 45 µm. As a result, particular particles (1) are obtained.

Using the particular particles (1) as a sample, the thermal behavior in the temperature range of −150° C. to 100° C. is analyzed with a differential scanning calorimeter (DSC-60A produced by Shimadzu Corporation). Two glass transition temperatures are observed. Table 4 indicates the glass transition temperatures.

The temperature T1 and the temperature T2 of the particular particles (1) are measured by the aforementioned measuring method. The particular particles (1) satisfy formula 1, "10° C.≤T1−T2".

A section of the particular particles (1) is observed with a scanning electron microscope (SEM). A sea-island structure is observed. The particular particles (1) have a core in which island phases are present, and a shell layer in which no island phases are present. The sea phase contains a styrene resin, and the island phases contain a (meth)acrylic acid ester resin. The average size of the island phases is determined by the aforementioned measuring method. The average size of the island phases is indicated in Table 4.

Into a V-type blender, 10 parts of the particular particles (1) and 100 parts of the following resin-coated carrier are placed, and the resulting mixture is stirred for 20 minutes. Then the mixture is screened through a vibrating screen having an aperture of 212 µm to obtain a developer (1).

Mn—Mg—Sr ferrite particles (average particle diameter: 40 µm: 100 parts

Toluene: 14 parts

Polymethyl methacrylate: 2 parts

Carbon black (VXC72 produced by Cabot Corporation): 0.12 parts

Glass beads (diameter: 1 mm, in an amount equal to the amount of toluene) and the above-described materials other than the ferrite particles are mixed, and the resulting mixture is stirred in a sand mill produced by KANSAI PAINT CO., LTD., at a rotation rate of 1200 rpm for 30 minutes. As a result, a dispersion is obtained. The dispersion and the ferrite particles are placed in a vacuum deaerator-type kneader, and the resulting mixture is dried at a reduced pressure under stirring to obtain a resin-coated carrier.

Preparation of Particular Particles (2) to (27) and Developers (2) to (27)

Particular particles (2) to (27) and developers (2) to (27) are prepared as with the preparation of the particular particles (1) except that the composite resin particle dispersion and the styrene resin particle dispersion are changed as indicated in Table 4.

The temperature T1 and the temperature T2 of the particular particles (2) to (27) are measured by the aforementioned measuring method. All of the particular particles (2) to (27) satisfy formula 1, "10° C.≤T1−T2".

Preparation of Comparative Particles (c1) to (c3) and Developers (c1) to (c3)

Particles (c1) to (c3) and developers (c1) to (c3) are prepared as with the preparation of the particular particles (1) except that the composite resin particle dispersion and the styrene resin particle dispersion are changed as indicated in Table 4.

Evaluation of Pressure-Responsive Phase Transition

The temperature difference (T1−T3), which is the indicator of how easily the particles undergo pressure-induced phase transition, is determined. For each particle sample, the temperature T1 and the temperature T3 are measured with a Flowtester (CFT-500 produced by Shimadzu Corporation), and the temperature difference (T1−T3) is calculated. Table 4 indicates the temperature difference (T1−T3).

Evaluation of Adhesiveness

An apparatus of a type illustrated in FIG. 4 is prepared as the apparatus for producing a printed material. In other words, an apparatus for producing a printed material is prepared, the apparatus being equipped with a five-stand-tandem intermediate transfer-type printing section that forms a color images and provides particular particles onto a recording medium, and a pressure-bonding section that has a folding device and a pressurizing device.

Particular particles (or comparative particles), a yellow toner, a magenta toner, a cyan toner, and a black toner are respectively placed in five developing devices in the printing section. Commercially available products produced by Fuji Xerox Co., Ltd., are used as the yellow toner, the magenta toner, the cyan toner, and the black toner.

Postcard paper V424 produced by Fuji Xerox Co., Ltd., is prepared as the recording medium.

The color image to be formed on the postcard paper is an image having an area density of 30% in which black characters and a full-color photographic image are both contained. The image is formed on one surface of the postcard paper.

The amount of the particular particles provided is 3 g/m$^2$ in the color image forming region in the color image forming surface of a postcard paper.

The folding device is a device that folds the postcard paper in two such that the color image forming surface is arranged on the inner side.

The pressurizing device is to apply a pressure of 90 MPa.

Ten postcards are continuously formed by using the above-described apparatus under the above-described conditions by folding a postcard paper in two with the color image forming surface arranged on the inner side and then bonding the flaps of the color image forming surface of the postcard paper.

The tenth postcard is cut in the long side direction at a width of 15 mm to prepare a rectangular test piece, and the test piece is subjected to the 90 degrees peel test. The peeling speed of the 90 degrees peel test is set to 20 mm/minute, the load (N) from 10 mm to 50 mm is sampled at 0.4 mm intervals after start of the measurement, the average of the results is calculated, and the loads (N) observed from three test pieces are averaged. The load (N) required for peeling is categorized as follows. The results are indicated in Table 4.

A: 0.8 N or more
B: 0.6 N or more but less than 0.8 N
C: 0.4 N or more but less than 0.6 N
D: 0.2 N or more but less than 0.4 N
E: Less than 0.2 N

TABLE 4

| Particles | Core | | | | | Average size of island phases | | | | | Pressure-responsive phase transition (T1-T3) | Adhesiveness |
|---|---|---|---|---|---|---|---|---|---|---|---|---|
| Particles | Composite resin particle dispersion | Polymerization components of St resin | Polymerization components of Ac resin | St resin/ Ac resin mass ratio (St:Ac) | Shell layer St resin particle dispersion | D50v μm | nm | Tg °C. | Tg °C. | Difference in Tg °C.° | T3 °C. | °C. | |
| c1 | cM1 | St/BA/AA = 78/20/2 | 2EHA = 100 | 50:50 | St1 | 8.0 | 600 | −50 | 54 | 104 | 95 | 3 | D |
| c2 | cM2 | St/BA/AA = 78/20/2 | BA = 100 | 50:50 | St1 | 8.0 | 550 | −53 | 54 | 107 | 93 | 4 | D |
| c3 | cM3 | St/2EHA/AA = 78/20/2 | BA = 100 | 50:50 | St12 | 11.0 | 570 | −53 | 56 | 109 | 93 | 4 | D |
| 1 | M1 | St/BA/AA = 78/20/2 | 2EHA/BA = 50/50 | 50:50 | St1 | 8.0 | 200 | −52 | 54 | 106 | 75 | 15 | A |
| 2 | M2 | St/BA/AA = 88/10/2 | 2EHA/BA = 50/50 | 50:50 | St2 | 11.0 | 250 | −52 | 76 | 128 | 70 | 13 | A |
| 3 | M3 | St/BA/AA = 83/15/2 | 2EHA/BA = 50/50 | 50:50 | St3 | 11.0 | 280 | −52 | 65 | 117 | 78 | 15 | A |
| 4 | M4 | St/BA/MAA = 78/20/2 | 2EHA/BA = 50/50 | 50:50 | St4 | 11.0 | 240 | −52 | 57 | 109 | 70 | 10 | A |
| 5 | M5 | St/BA/4HBA = 80/15/5 | 2EHA/BA = 50/50 | 50:50 | St5 | 11.0 | 240 | −52 | 55 | 107 | 74 | 16 | A |
| 6 | M6 | St/BA/2EHA = 80/15/5 | 2EHA/BA = 50/50 | 50:50 | St6 | 11.0 | 250 | −52 | 54 | 106 | 73 | 14 | A |
| 7 | M7 | St/BA = 80/20 | 2EHA/BA = 50/50 | 50:50 | St7 | 9.5 | 250 | −52 | 54 | 106 | 73 | 13 | A |
| 8 | M8 | St/BA/CEA = 77/20/3 | 2EHA/BA = 50/50 | 50:50 | St8 | 9.5 | 250 | −52 | 54 | 106 | 75 | 10 | A |
| 9 | M9 | St/BA/AA = 72/26/2 | 2EHA/BA = 50/50 | 50:50 | St9 | 9.5 | 220 | −52 | 43 | 95 | 75 | 15 | A |
| 10 | M10 | St/BA/AA = 68/30/2 | 2EHA/BA = 50/50 | 50:50 | St10 | 9.5 | 230 | −52 | 35 | 87 | 73 | 15 | A |
| 11 | M11 | St/2EHA = 80/20 | 2EHA/BA = 50/50 | 50:50 | St11 | 9.5 | 220 | −52 | 56 | 108 | 72 | 15 | A |
| 12 | M12 | St/2EHA/AA = 78/20/2 | 2EHA/BA = 50/50 | 50:50 | St12 | 9.5 | 230 | −52 | 56 | 108 | 75 | 20 | A |
| 13 | M13 | St/2EHA/AA = 78/20/2 | 2EHA/HA = 50/50 | 50:50 | St12 | 5.8 | 250 | −55 | 56 | 111 | 70 | 15 | A |
| 14 | M14 | St/EA/AA = 63/35/2 | 2EHA/PA = 50/50 | 50:50 | St13 | 5.8 | 350 | −45 | 54 | 99 | 80 | 5 | B |
| 15 | M15 | St/BA/AA = 78/20/2 | 2EHA/MA = 50/50 | 50:50 | St1 | 5.8 | 400 | −54 | 54 | 108 | 81 | 7 | B |
| 16 | M16 | St/BA/AA = 78/20/2 | 2EHA/BA = 90/10 | 50:50 | St1 | 8.0 | 400 | −51 | 54 | 105 | 80 | 10 | B |
| 17 | M17 | St/BA/AA = 78/20/2 | 2EHA/BA = 80/20 | 50:50 | St1 | 8.0 | 300 | −52 | 54 | 106 | 70 | 20 | A |
| 18 | M18 | St/BA/AA = 78/20/2 | 2EHA/BA = 70/30 | 50:50 | St1 | 8.0 | 250 | −52 | 54 | 106 | 75 | 15 | A |
| 19 | M19 | St/BA/AA = 78/20/2 | 2EHA/BA = 30/70 | 50:50 | St1 | 8.0 | 250 | −52 | 54 | 106 | 73 | 15 | A |
| 20 | M20 | St/BA/AA = 78/20/2 | 2EHA/BA = 20/80 | 50:50 | St1 | 8.0 | 300 | −52 | 54 | 106 | 75 | 20 | A |
| 21 | M21 | St/BA/AA = 78/20/2 | 2EHA/BA = 10/90 | 50:50 | St1 | 8.0 | 400 | −53 | 54 | 107 | 80 | 9 | B |
| 22 | M22 | St/BA/AA = 78/20/2 | 2EHA/BA = 50/50 | 90:10 | St1 | 8.0 | 450 | −52 | 54 | 106 | 85 | 5 | C |
| 23 | M23 | St/BA/AA = 78/20/2 | 2EHA/BA = 50/50 | 80:20 | St1 | 8.0 | 400 | −52 | 54 | 106 | 80 | 10 | B |
| 24 | M24 | St/BA/AA = 78/20/2 | 2EHA/BA = 50/50 | 70:30 | St1 | 8.0 | 250 | −52 | 54 | 106 | 75 | 15 | A |
| 25 | M25 | St/BA/AA = 78/20/2 | 2EHA/BA = 50/50 | 30:70 | St1 | 8.0 | 210 | −52 | 54 | 106 | 73 | 13 | A |
| 26 | M26 | St/BA/AA = 78/20/2 | 2EHA/BA = 50/50 | 20:80 | St1 | 8.0 | 230 | −52 | 54 | 106 | 72 | 13 | A |
| 27 | M27 | St/BA/AA = 78/20/2 | 2EHA/BA = 50/50 | 10:90 | St1 | 8.0 | 250 | −52 | 54 | 106 | 72 | 13 | A |

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for producing a printed material, the method comprising:
    forming a color image having an image area ratio of 20% or less on a peripheral edge portion of a recording medium by using a coloring material;
    providing pressure-induced phase transition particles to a region of the recording medium, the region including the peripheral edge portion;
    bonding the color image and the pressure-induced phase transition particles onto the recording medium; and
    folding the recording medium having the color image and the pressure-induced phase transition particles bonded thereon and pressure-bonding the folded recording medium, or pressure-bonding the recording medium having the color image and the pressure-induced phase transition particles bonded thereon and another recording medium placed on top of each other,
    wherein:
    the pressure-induced phase transition particles contain a styrene resin and a (meth)acrylic acid ester resin, the styrene resin contains styrene and a vinyl monomer other than styrene as polymerization components, the (meth)acrylic acid ester resin contains at least two (meth)acrylic acid esters as polymerization components, and a mass ratio of the (meth)acrylic acid esters is 90 mass % or more of a total of all polymerization components of the (meth)acrylic acid ester resin, and
    the pressure-induced phase transition particles have at least two glass transition temperatures, and a difference between the lowest glass transition temperature and the highest glass transition temperature among the glass transition temperatures of the pressure-induced phase transition particles is 30° C. or more.

2. The method for producing a printed material according to claim 1, wherein the image area ratio of the color image is 10% or less.

3. The method for producing a printed material according to claim 1, wherein the image area ratio of the color image is 2% or more.

4. The method for producing a printed material according to claim 1, wherein the forming of the color image involves forming a pattern image of the color image on the peripheral edge portion of the recording medium.

5. The method for producing a printed material according to claim 4, wherein the pattern image is a dotted pattern image.

6. The method for producing a printed material according to claim 4, wherein the pattern image is a yellow image.

7. The method for producing a printed material according to claim 1, wherein a mass ratio of styrene is within a range of 60 mass % to 95 mass % of a total of all polymerization components of the styrene resin in the pressure-induced phase transition particles.

8. The method for producing a printed material according to claim 1, wherein a mass ratio between two (meth)acrylic acid esters contained at the largest mass ratio and the second largest mass ratio among the at least two (meth)acrylic acid esters contained as polymerization components of the (meth) acrylic acid ester resin in the pressure-induced phase transition particles is within a range of 80:20 to 20:80.

9. The method for producing a printed material according to claim 1, wherein two (meth)acrylic acid esters contained at the largest mass ratio and the second largest mass ratio among the at least two (meth)acrylic acid esters contained as polymerization components of the (meth)acrylic acid ester resin in the pressure-induced phase transition particles are (meth)acrylic acid alkyl esters, and a difference in the number of carbon atoms between alkyl groups in the two (meth)acrylic acid alkyl esters is within a range of 1 to 4.

10. The method for producing a printed material according to claim 1, wherein the vinyl monomer contained as a polymerization component of the styrene resin contains a (meth)acrylic acid ester.

11. The method for producing a printed material according to claim 1, wherein the vinyl monomer contained as a polymerization component of the styrene resin is selected from n-butyl acrylate and 2-ethylhexyl acrylate.

12. The method for producing a printed material according to claim 1, wherein the styrene resin and the (meth) acrylic acid ester resin contain the same (meth)acrylic acid ester as a polymerization component.

13. The method for producing a printed material according to claim 1, wherein the (meth)acrylic acid ester resin contains 2-ethylhexyl acrylate and n-butyl acrylate as polymerization components.

14. The method for producing a printed material according to claim 1, wherein an amount of the styrene resin contained in the pressure-induced phase transition particles is larger than an amount of the (meth)acrylic acid ester resin contained in the pressure-induced phase transition particles.

15. The method for producing a printed material according to claim 1, wherein the pressure-induced phase transition particles have a sea phase containing the styrene resin and island phases containing the (meth)acrylic acid ester resin and being dispersed in the sea phase.

16. The method for producing a printed material according to claim 15, wherein the island phases have an average size within a range of 200 nm to 500 nm.

17. The method for producing a printed material according to claim 1, wherein the pressure-induced phase transition particles have a core containing the styrene resin and the (meth)acrylic acid ester resin, and a shell layer covering the core.

18. The method for producing a printed material according to claim 17, wherein the shell layer contains the styrene resin.

19. The method for producing a printed material according to claim 1, wherein a temperature at which the pressure-induced phase transition particles exhibit a viscosity of 10000 Pa·s at a pressure of 4 MPa is 90° C. or less.

* * * * *